US009153094B2

(12) United States Patent
Hamlin et al.

(10) Patent No.: US 9,153,094 B2
(45) Date of Patent: Oct. 6, 2015

(54) ONLINE PRESENCE FOR A WAGERING GAME MACHINE

(75) Inventors: Vernon W. Hamlin, Lisle, IL (US);
Brian J. Barclay, Atlanta, GA (US);
Andrew Fowler, Chicago, IL (US);
Andrew C. Guinn, Chicago, IL (US);
Richard B. Robbins, Glenview, IL (US);
Richard T. Schwartz, Deerfield, IL (US)

(73) Assignee: WMS Gaming, Inc., Waukegan, IL (US)

( * ) Notice: Subject to any disclaimer, the term of this patent is extended or adjusted under 35 U.S.C. 154(b) by 417 days.

(21) Appl. No.: 13/594,529

(22) Filed: Aug. 24, 2012

(65) Prior Publication Data
US 2013/0225298 A1 Aug. 29, 2013

Related U.S. Application Data

(63) Continuation of application No. 13/499,010, filed as application No. PCT/US2010/050703 on Sep. 29, 2010, now Pat. No. 8,668,590.

(60) Provisional application No. 61/247,185, filed on Sep. 30, 2009.

(51) Int. Cl.
*A63F 9/24* (2006.01)
*G07F 17/32* (2006.01)
*G06Q 10/10* (2012.01)
*G06Q 50/34* (2012.01)

(52) U.S. Cl.
CPC ............ *G07F 17/3225* (2013.01); *G06Q 10/10* (2013.01); *G06Q 50/34* (2013.01); *G07F 17/32* (2013.01); *G07F 17/3227* (2013.01); *G07F 17/3232* (2013.01); *G07F 17/3234* (2013.01); *G07F 17/3244* (2013.01)

(58) Field of Classification Search
CPC ...................................................... G07F 17/32
USPC ................................................. 463/16, 20, 42
See application file for complete search history.

(56) References Cited

U.S. PATENT DOCUMENTS

| 2010/0062840 A1 | 3/2010 | Herrmann |
| 2012/0184363 A1 | 7/2012 | Barclay et al. |
| 2014/0135109 A1 | 5/2014 | Barclay et al. |

FOREIGN PATENT DOCUMENTS

| JP | 2007-058494 A † | 3/2007 |
| JP | 2007058494 | 3/2007 |
| WO | WO-2009042563 | 4/2009 |
| WO | WO-2009097538 | 8/2009 |
| WO | WO-2009111515 | 9/2009 |
| WO | WO-2011041400 | 4/2011 |

OTHER PUBLICATIONS

"U.S. Appl. No. 13/499,010 Office Action", Jun. 11, 2013, 7 pages.
(Continued)

*Primary Examiner* — Omkar Deodhar
(74) *Attorney, Agent, or Firm* — DeLizio Law, PLLC

(57) ABSTRACT

A computer-implemented method includes creating, by at least one processor, an online presence for a wagering game machine. The method also includes publishing wagering game activity that has occurred at the wagering game machine to the online presence for the wagering game machine.

20 Claims, 11 Drawing Sheets

(56) References Cited

OTHER PUBLICATIONS

"PCT Application No. PCT/US10/50703 International Preliminary Report on Patentability", Apr. 20, 2012, 4 pages.

"PCT Application No. PCT/US10/50703 International Search Report", Nov. 29, 2010, 9 pages.

"U.S. Appl. No. 14/158,332 Office Action", Jan. 13, 2015, 12 Pages.

† cited by third party

ONLINE PRESENCE FOR A WAGERING GAME MACHINE

RELATED APPLICATIONS

This application claims the priority benefit of U.S. patent application Ser. No. 13/499,010 filed Sep. 29, 2010, which claims priority benefit of U.S. Provisional Application Ser. No. 61/247,185 filed Sep. 30, 2009.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

TECHNICAL FIELD

Embodiments of the inventive subject matter relate generally to wagering game systems and networks that, more particularly, include an online presence for a wagering game machine.

BACKGROUND

Wagering game machines, such as slot machines, video poker machines and the like, have been a cornerstone of the gaming industry for several years. Traditionally, wagering game machines have been confined to physical buildings, like casinos (e.g., resort casinos, roadside casinos, etc.). The casinos are located in specific geographic locations that are authorized to present wagering games to casino patrons. However, with the proliferation of interest and use of the Internet, shrewd wagering game manufacturers have recognized that a global public network, such as the Internet, can reach to various locations of the world that have been authorized to present wagering games. Any individual with a personal computing device (e.g., a personal computer, a laptop, a personal digital assistant, a cell phone, etc.) can connect to the Internet and play wagering games. Consequently, some wagering game manufacturers have created wagering games that can be processed by personal computing devices and offered via online casino websites ("online casinos"). However, online casinos face challenges and struggles. For instance, online casinos have struggled to provide the excitement and entertainment that a real-world casino environment provides. Some online casinos have struggled enforcing cross jurisdictional restrictions and requirements. Further, some online casinos have struggled adapting the online gaming industry to a traditionally non-wagering game business environment. As a result, wagering game manufacturers, casino operators, and online game providers are constantly in need of innovative concepts that can make the online gaming industry appealing and profitable.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
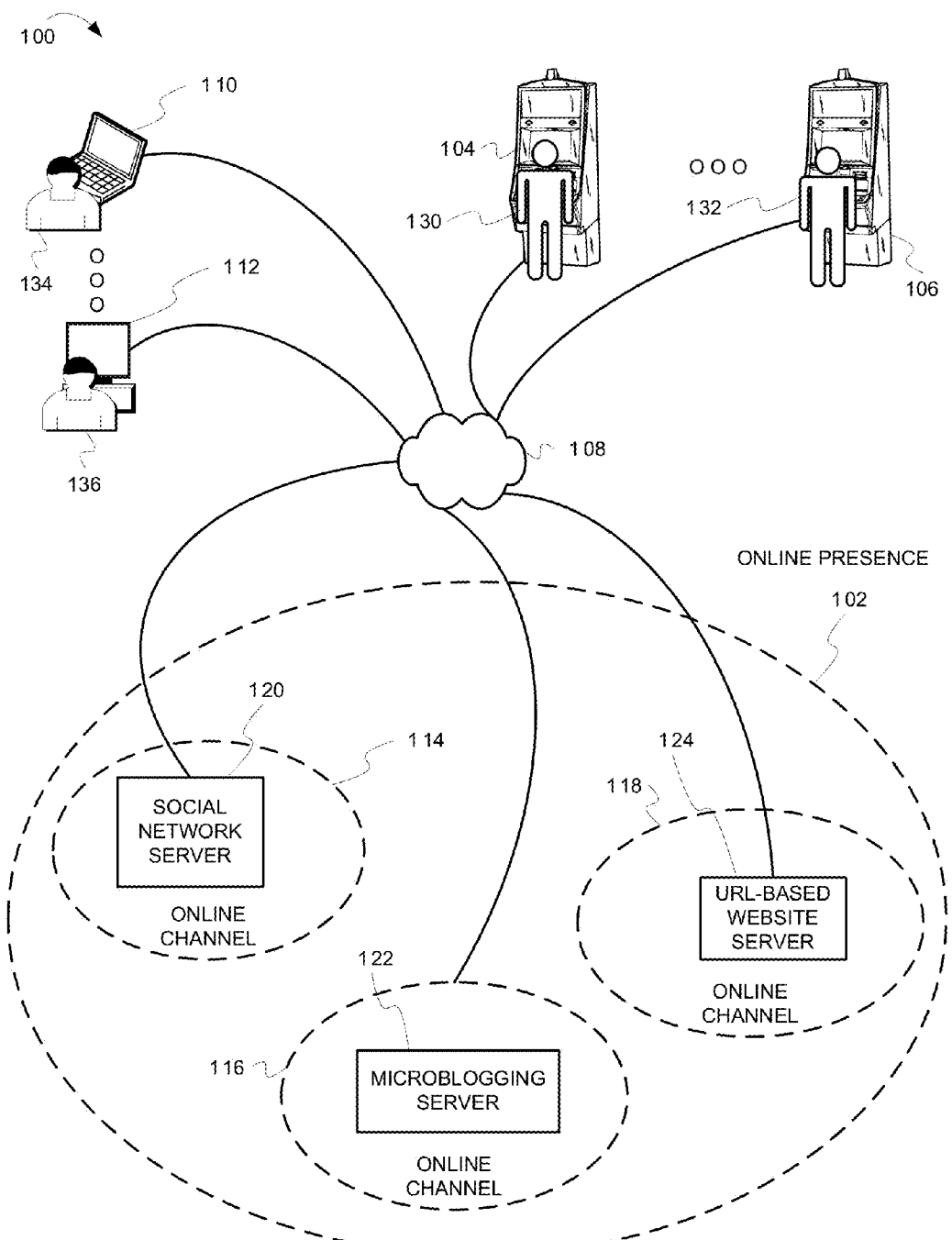
FIG. 1 depicts a system that includes an online presence of a wagering game machine, according to some embodiments.

Online Presence for a Wagering Game Machine

Introduction

People can use social networks to establish an online presence. For example, people can create accounts on social networking websites, such as Facebook, Twitter, Linked-In, etc. By posting personal information on such social networking websites, people establish an "online presence". Some embodiments enable wagering game machines to establish an online presence, in ways similar how people establish an online presence. Some embodiments enable a wagering game machine to sign-up for and "own" a social networking account, a microblogging account, a URL for the machine's own online website, etc. Using these various internet-based social media, wagering game machines can establish their own online presence. By owning social networking accounts, wagering game machines can post information and media (e.g., text, video, audio, etc.) to the social networking accounts. Such posts describe activities occurring at the machine. Accordingly, players can follow a given wagering game machine's activities by monitoring the machine's online presence (e.g., Facebook posts, Twitter tweets, etc.). For example, on Facebook, a machine's account may be viewable by everyone (not just "friends"). Players can sign-on to Facebook and view the machine's posts about activities occurring on the machine. Therefore, embodiments enable players to follow activities on a wagering game machine even when they are not present at the machine.

Some embodiments enable wagering game machines to post various media, such as live feeds of wagering game activity (e.g., videos of spinning reels for a slots game), notifications of certain wins (e.g., jackpots, progressive wins, etc.), leader boards for different wagering game activity, notification if wagering is currently occurring, a history of wagering game activity (e.g., a list of the amounts, date and time of the last 50 big wins), etc. The wagering game activity can also comprise idle activity where active wagering operations are not occurring.

Each wagering game machine can have a personality defined by one or more factors, such as a theme of games played on the machine, the machine's physical location, etc. The machine's personality can then determine, at least in part, a type of information to publish on the machine's social networking accounts. For example, one wagering game machine's personality can require publishing of: 1) wins above $50,000, 2) the number of times the max button is selected, etc. A second wagering game's personality can require publishing of: 1) wins above $500, 2) any progressive wins, etc.

Some embodiments allow for anonymity of people involved in the wagering game activity, and people following the machine's online presence (e.g., Facebook account, the machine's website, etc.). In particular, some embodiments allow for a range of engagement with a machine's online presence. For example, a highest level of engagement for tracking an online presence can include a person becoming a "friend" of the wagering game machine on a social network. In another example, a mid level of engagement can include a person logging into a social media website to view public posts by the machine. In another example, a lowest level of engagement for tracking a machine's online presence can include a person accessing a website updated and controlled by the wagering game machine. In such an example, the person may not be required to provide identification to access the website. Also, wagering game players can opt out of having their wagering game play published.

In some embodiments, one wagering game machine can subscribe to an online presence of another wagering game machine. For example, wagering game machine A with game theme X could subscribe to wagering game machine B that also has theme X. Accordingly, the feeds from wagering game machine B could be posted on the feeds for wagering game machine A. Therefore, a person viewing machine A's online presence could also see updates from machine B. For example, the person could see jackpot wins from machine B on machine A's Facebook wall.

System Environment for an Online Presence

FIG. 1 depicts a system that enables wagering game machines to establish an online presence, according to some embodiments. A system 100 includes a number of wagering game machines (illustrated as a wagering game machine 104 and a wagering game machine 106) that are communicatively coupled to a network 108. The system 100 also includes a number of devices (illustrated as a device 110 and a device 112) that are communicatively coupled to the network 108. The devices 110 and 112 can be any type of device that can perform network communications (e.g., desktop computer, notebook computer, smartphone, etc.).

The system 100 includes a number of servers (illustrated as a social network server 120, a microblogging server 122, and a URL-based website server 124) that are communicatively coupled to the network 108. Each of the social network server 120, the microblogging server 122, and the URL-based website server 124 define online channels that make up an online presence 102 for the wagering game machine 104. In particular, the social network server 120 is an online channel 114, the microblogging server 122 is an online channel 116, and the URL-based website server 124 is an online channel 118. The online channels 114-118 together serve as online channels included in the online presence 102. As noted, in FIG. 1, the online presence 102 is for the wagering game machine 104. However, wagering game machine 106 may have the same online presence.

In FIG. 1, a wagering game player 130 is playing a wagering game at the wagering game machine 104. A wagering game player 132 is playing a wagering game at the wagering game machine 106. A person 134 is using the device 110, and a person 136 is using the device 112.

The wagering game machines 104-106 can be either physical machines or virtual representations. For example, a physical wagering game machine can be a machine located in a brick-and-mortar wagering game establishment or any other type device (e.g., a mobile device) that provides for wagering game play regardless of location. In some embodiments, a wagering game machine can also be a virtual representation of a machine. For example, online wagering play can include virtual casinos that have virtual representations of wagering game machines located on the floor of the virtual casino.

In this example, the wagering game machine 104 creates the online presence 102. A software application executing on the wagering game machine 104 can create the online presence 102. In particular, the software application can use Application Programming Interfaces (APIs) for accessing the different online channels (e.g., social media websites). The software application can create accounts for the different online channels (e.g., a social network account, a microblogging account, etc.), thereby creating an online presence for the wagering game machine. Also, the software application (e.g., a bot) can transmit data about wagering game activity to the different online channels. This data is then published or posted to one or more of the different online channels. For example, the wagering game machine can publish (or post) different types of data (e.g., text, video, audio, etc.) regarding wagering game activity that occurred at the machine. Accordingly, persons (e.g., wagering game players) can follow activity for a given wagering game machine based on its online presence (even when the persons are not present at the machine). The audio and video can be based on a live feed from a camera, where the audio and video include the reactions of the wagering game player playing the game. Alternatively or in addition, the audio and video provided as part of the online presence can be a stream of data that represents what is actually being presented to the player (independent of capturing by a camera).

Examples of the different data that is published to an online presence includes live feeds of wagering game activity (e.g., spinning reels for a slots game), notifications of certain wins (e.g., jackpots, progressive wins, etc.), leader boards for different wagering game activity, notification if wagering is currently occurring, a history of wagering game activity (e.g., a list of the amounts, date and time of the last 50 big wins, etc.), etc. Other examples include the different wagering games that are currently available for play at the wagering game machine, its current denominations, its line counts, and its physical location.

The wagering game machine 104 can also post more "human-like" messages that are indicative of wagering game activity. For example, if the amount of coin-in exceeds a monetary amount in a given time period (e.g., six hours), the wagering game machine 104 can publish "I am busy!" Or, if there has been no wagering for a given time period (e.g., one hour), the wagering game machine can publish "I am lonely!" The wagering game machine 104 can also publish more personalized messages to specific persons. For example, the wagering game machine 104 can publish "I have not seen Jim Smith in over a month" or "I miss you Jane Anderson—you were my last big winner."

Also, data for one type of wagering game activity (e.g., progressive wins) can be published in one online channel, but not in a different online channel for one particular wagering game machine. Each wagering game machine can be unique about what is published and to which online channel(s) to publish. For example, each wagering game machine can have its own personality that is defined based on the theme of the game being thereon, its physical location, etc. The machine's personality can then determine, at least in part, the type of information to publish for its online presence. For example, one wagering game machine's personality can require publishing of: 1) wins above $5,000, 2) the number of times the max button is selected, etc. In contrast, a second wagering game's personality can require publishing of: 1) wins above $500, 2) any progressive wins, etc.

Some embodiments can allow for anonymity for the persons involved in the wagering game activity and the persons following an online presence. As described above, some embodiments allow for a range of engagement with the online presence. For example, the person 134 may want to be anonymous by viewing the online presence of the wagering game machine 104 by accessing the website hosted by the URL-based website server 124. While, the person 136 may want a higher level of engagement. For example, the person 136 can "friend" the wagering game machine 104 for the social network hosted by the social network server 120. Accordingly, a minimum level of involvement can begin with a person only having knowledge of the location of the wagering game machine. Based on that knowledge, the person can then decide how involved they want to be in tracking the online presence of the wagering game machine. For example, the person can track the machine's online presence through a website, becoming a friend of the machine on a social media website, etc.

As described, the wagering game machine publishes information to its online presence without a request for such information by a person. Also, wagering game players can opt out of having their wagering game play being published as part of the online presence of the wagering game machine.

In some embodiments, one wagering game machine can subscribe to an online presence of a different wagering game machine. For example, the wagering game machine 104 can subscribe ("friend" on a social network) to the wagering game machine 106. The wagering game machine 104 can subscribe to other wagering game machines having a same wagering game theme, other wagering game machines in a same wagering game establishment, other wagering game machine having a same wagering game theme across all wagering game establishments for a given city or region, etc. Accordingly, the feeds from the online presence of the wagering game machine 106 could be published on the feed for the wagering game machine 104. Therefore, a person viewing the online presence of the wagering game machine 104 could also see the feed updates for the wagering game machine 106. Such examples are provided below in conjunction with the description of FIG. 2. Also, a physical wagering game machine at a brick-and-mortar wagering game establishment can follow the online presence of a virtual wagering game machine.

The wagering game machine 104 can also establish relationships with persons based on the wagering game activity at the wagering game machine 104. In particular, the wagering game machine 104 provides access to its online presence to a person if that person has performed various activities, such as wagered at least a given monetary amount at the wagering game machine, won a given number of times, wagered at the particular wagering game machine a give number of times on separate occasions, etc. For example, the wagering game machine 104 may "friend" the person 136 on a social network because the person 136 has wagered at least $100 at the wagering game machine 104.

In some embodiments, a wagering game player can log into their player account to play the wagering game machine. For example, the wagering game player 130 can log into their player account to play the wagering game machine 104. As further described below, this player account can be associated with the player's accounts for tracking an online presence. For example, the player account and the accounts for different online channels (e.g., social networking websites, blogging websites, etc.) can communicate with each other. Accordingly, if the wagering game player 130 has logged into their player account, the wagering game machine 104 could send direct messages or make friend requests to the wagering game player 130 through their accounts for tracking an online presence for the wagering game machine 104.

Also, the wagering game machine can make an inquiry to the wagering game player during play of the wagering game machine. The inquiry can be a request for the wagering game player to follow the online presence for the wagering game machine. For example, the inquiry can include an option to allow the wagering game player to create an account at one or more online channels to monitor the machine's online presence. To illustrate, the wagering game machine 104 can present an input window on one of its displays to the wagering game player 130 during wagering game play. If the wagering game player does provide the necessary input (e.g., user ID and password for setting up or accessing an account) for accessing at least one online channel, the wagering game machine can communicate over the network with the associated server for the online channel(s) using APIs for the associated server.

In some embodiments, websites may provide online play of wagering games typically available at real-life wagering game machines. Websites may also provide online non-wagering versions of such wagering games. Also, websites may provide casual (non-wagering) games that are not functionally equivalent to wagering games, but still relate to the wagering games. There may be a synergy between wagering games at a real-life wagering game machine, the machine's online presence, its counterpart online wagering game version, its counterpart online non-wagering version, and its counterpart casual games.

For some wagering games played on wagering game machines, there are counterpart wagering games for online play, including both desktop and mobile versions. These counterpart games can be functionally equivalent to the wagering game offered on the real-life wagering game machine. Also, these counterpart games can be either non-wagering or wagering. In some embodiments, these counterpart games can provide an option to enable the player to access the online presence of one or more wagering game machines with the wagering game. For example, the person 134 can play the online wagering version of a wagering game offered at wagering game machine 104, while the person 136 can play an online non-wagering version of the same game.

These online versions can attempt to motivate the persons 134-136 to access the online presence for the wagering game machine 104. For example, these online versions can provide the URL addresses for five of the wagering game machines having the highest payout in the last month (including the wagering game machine 104). This allows the player to access activity of the wagering game (through an online presence of a particular wagering game machine). Such access could motivate the persons 134-136 to play the wagering game version on the wagering game machine 104. Additionally, the wagering game machine 104 itself can provide information about its online presence (e.g., account ID for a social network account) to the wagering game player.

Also, a different website can allow for play of casual (non-wagering) games that relate to the wagering game. The play of these casual games can affect the play of the wagering game. For example, some wagering games are episodic wherein a player unlocks new episodes based on game play of current episodes at the wagering game machine. The play of these casual games allows a player to earn points that are credited to unlocking of new episodes on the wagering game at the wagering game machine. Accordingly, the player can advance to a new episode of a wagering game based on play of these casual games. For example with reference to FIG. 1, the wagering game player 130 can play these casual (non-wagering) games through the website that relate to the wagering game at the wagering game machine 104 (prior to arrival at the wagering game machine 104). The wagering game player 130 may then be further along in the play of the wagering game based on the play of these casual (non-wagering) games. Similar to the online versions of the wagering game (described above), this website for play of casual games can attempt to motivate the wagering game player 130 to access the online presence for the wagering game machine 104. For example, this website for play of casual games can provide information about the different online channels (social network server) enabling access to the online presence for the wagering game machine 104.

The wagering game machine 104 can also provide information on how to access its counterpart wagering versions and non-wagering version and play of the casual games (e.g., URL addresses of the websites). Also, the wagering game machine 104 can provide an option to the wagering game player 130 to convert some of the money into virtual coins used for play of the counterpart non-wagering version or transfer of actual monies used for play of the counterpart wagering version. For example, if the wagering game player is about to cash-out, the wagering game machine can provide an option to allow the player to convert at least some of their money to virtual coins for play of the counterpart non-wagering version. Accordingly, these different aspects of the wagering game can drive players to one another. For example, the wagering game machine, its counterpart wagering version, its counterpart non-wagering version, and its counterpart casual games can attempt to drive a wagering game player to follow the online presence of the wagering game machine.

As described above, each wagering game machine can have its own personality, wherein the personality can then determine, at least in part, the type of information to publish for its online presence. In some embodiments, the activity occurring at one or more of the counterpart wagering version, the counterpart non-wagering version, and the counterpart casual games can affect the personality of the wagering game machine. For example, if the players are playing a particular bonus game in the online version of the wagering game (either wagering or non-wagering), the online presence is altered to provide information about this particular bonus game.

Example Interface for an Online Presence

Figure 2:
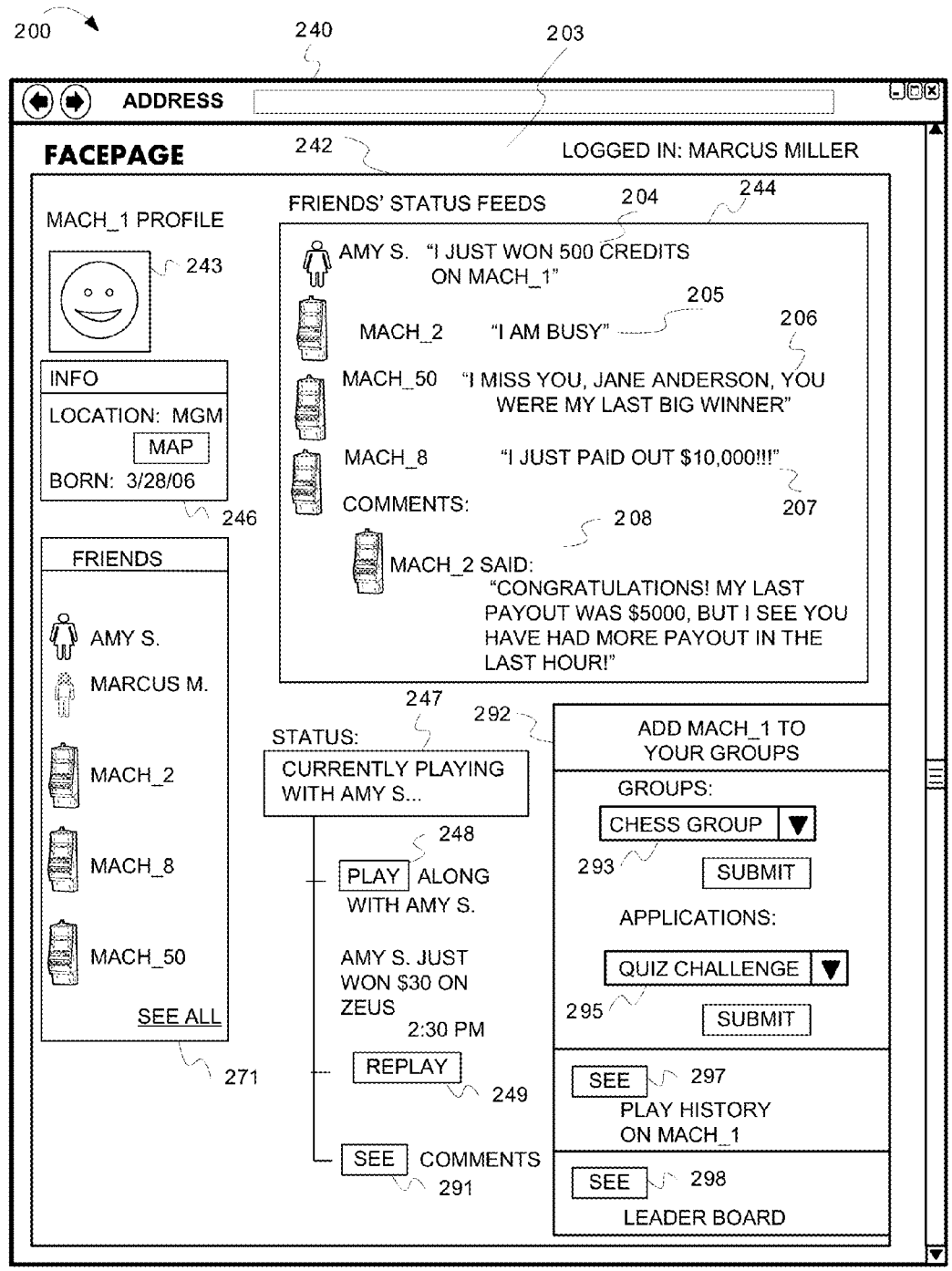
FIG. 2 depicts an example interface for an online presence, according to some embodiments.

FIG. 2 depicts an example interface for a wagering game machine's online presence, according to some embodiments. In particular, FIG. 2 depicts a screenshot 200 of an example interface for one of the online channels that forms an online presence for the wagering game machine 104 of FIG. 1. In this example, the online channel is a social network. The screenshot 200 shows an interface viewable on one of the devices 110-112. The screenshot 200 illustrates an interface for a social networking website 203 in a web browser 240. As further described below, this interface provides different information about wagering game activity for the wagering game machine 104. Similar information can be provided for other online channels that are part of the machine's (104) online presence (e.g., a microblogging website, a website, etc.). With reference to FIG. 1, the social networking website 203 presents a social network profile 242 for a social network account. The social network account is for the wagering game machine 104.

The social network server 120 can present identifying information 243 (e.g. a machine name, an avatar, thematic artwork, etc.) for the wagering game machine 104. In some embodiments, the social network server 120 presents descriptive information 246 of the wagering game machine's location, history, statistics, or other properties and characteristics (e.g., how to access a wagering game machine, what the wagering game machine is paying out, etc). The descriptive information 246 can include a map application that shows a map graphic depicting the descriptive information 246.

The social network server 120 can present a list 271 of friends of the wagering game machine 104 as part of the social network profile 242 for the wagering game machine 104. As shown, the friends include persons and other wagering game machines. The persons that are friends include Amy S. and Marcus M. The other wagering game machines that are friends include Mach__2, Mach__8, and Mach__50.

The social network server 120 can also present friends' status feeds 244 as part of the social network profile 242 for the wagering game machine 104. As shown, the friends' status feeds 244 can include updates from persons and other wagering game machines that are friends of the wagering game machine 104. In this example, a friend status 204 is notification from Amy S., indicating that she won 500 credits on Mach__1 (the name for the wagering game machine 104). A friend status 205 is notification from Mach__2, indicating that this wagering game machine is busy. A friend status 206 is notification from Mach__50, indicating that this wagering game machine is missing a previous winner (Jane Anderson). A friend status 207 is notification from Mach__8, indicating that this wagering game machine just paid out $10,000. Also, a comment 208 was adding regarding the friend status 207. Specifically, the comment 208 was from Mach__2, indicating a congratulations to Mach__8 and a notification regarding its most recent payout.

The social network server 120 can also present a status 247 for the wagering game machine 104 as part of the social network profile 242 for the wagering game machine 104. For example, the social network server 120 can present a status message 247 about what the wagering game machine 104 is doing (e.g., playing a game with Amy S.). In some embodiments, the social network server 120 can provide levels of benefits based on degrees of wagering activity. For example, the social network server 120 can require that a player perform certain activities using the wagering game machine 104, or on different wagering game machines (e.g., require that the player play games at different locations, on different wagering game machines), to unlock a game application 248. The social network server 120 and the wagering game machine 104 can report player activities and accomplishments back and forth to each other to update the game application 248 and unlock access to the game application 248, or access to different levels of the game application 248, once the player performs the activities.

Further, the social network server 120 can post videos of player activities (e.g., replays, wins, etc.) using a video sharing application 249, wherein the videos are provided by the wagering game machine 104. The video that is posted can be a live feed from a camera, wherein the audio and video include the reactions of the wagering game player playing the game. Alternatively or in addition, the video can be a stream of data that represents what is actually being presented to the player (independent of capturing by a camera). The social network server 120 can also provide a comments feature 291 to enable friends of the wagering game machine 104 to provide comments about the status of the wagering game machine 104.

The social network server 120 can integrate with social network applications indicated in an applications console 292, or elsewhere on the social network website 203. The social network applications can provide levels of benefits (e.g. levels of information, access, rewards, privileges, etc.) for the social network applications. For example, social network server 120 can make friend's accounts (i.e., social contact accounts linked to a player-owned social network account) eligible to win sweepstakes offered by a sweepstakes application on the social networking website 203. In another example, social network server 120 can present statistics in a statistical or information application or features. For instance, social network server 120 can determine statistics for the wagering game machine 104, such as a popularity of the wagering game machine by all players or, specifically, by one or more linked social network accounts that are linked to the social network account. The social network server 120 can review a machine's play history (e.g., review who has played the wagering game machine and when), and submit the play history to a popularity-tracking social network application 297 that can list the popularity of the wagering game machine 104 based on the play history. The social network server 120 can also compare an individual player's history to other players' histories to generate a comparison of the popularities among individual players.

The social network server 120 can submit the comparison to the popularity-tracking social network application 297 to present on the social network website 203. In yet another example, the social network server 120 can control a leader board application 298 that posts rankings of players that are participating in a gaming tournament. In another example, the wagering game machine 104 can report information to groups 293 using group applications 295 that feed to groups of users (e.g., send a picture of a player at the wagering game machine 104 to a group of friends using a picture sharing application).

Example Operations for an Online Presence

This section describes operations associated with some embodiments. In the discussion below, a flowchart is described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in the flowchart.

Figure 3:
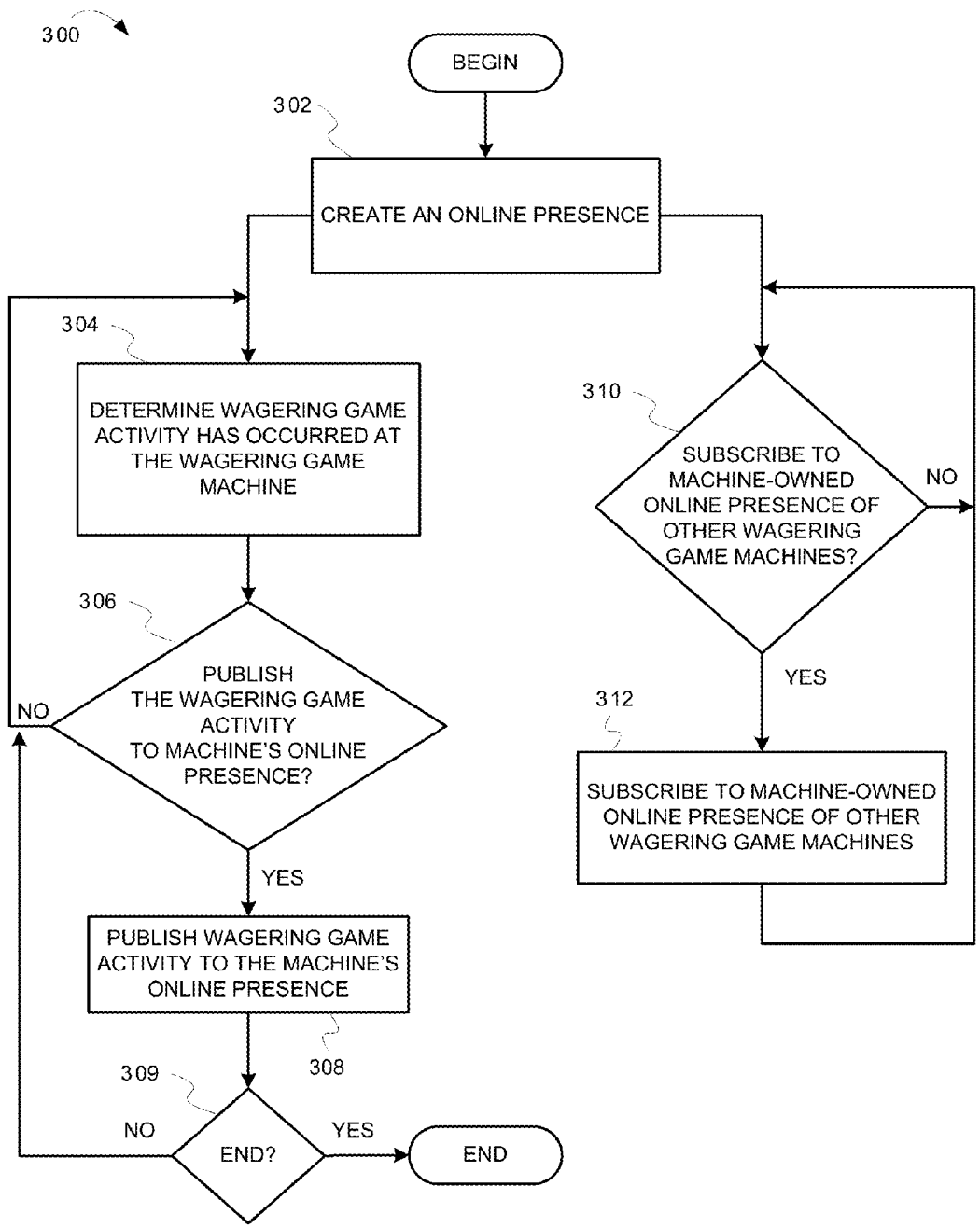
FIG. 3 depicts a flowchart illustrating operations to provide an online presence for a wagering game machine, according to some embodiments.
Figure 9:
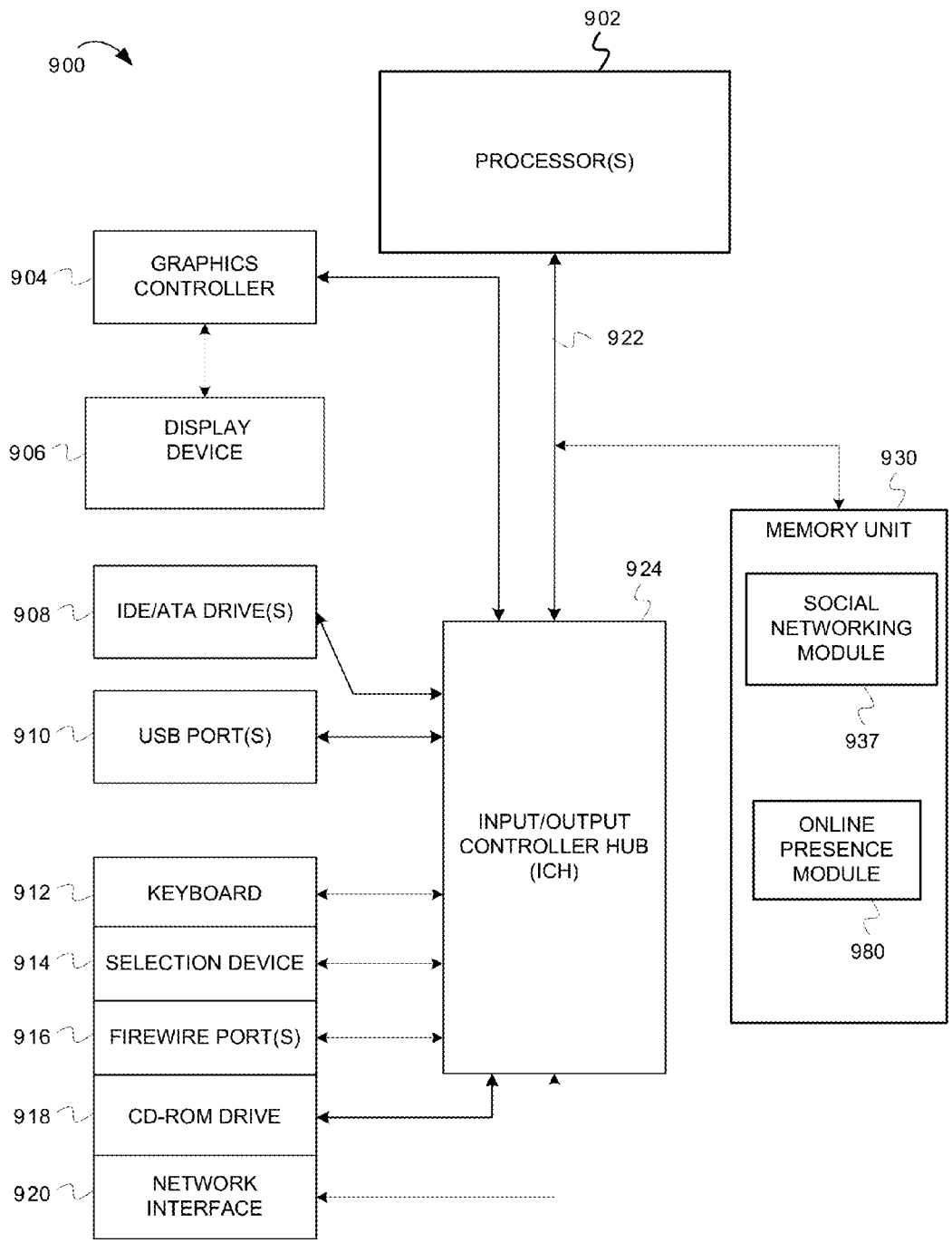
FIG. 9 depicts an illustration of a wagering game computer system, according to some embodiments.
Figure 10:
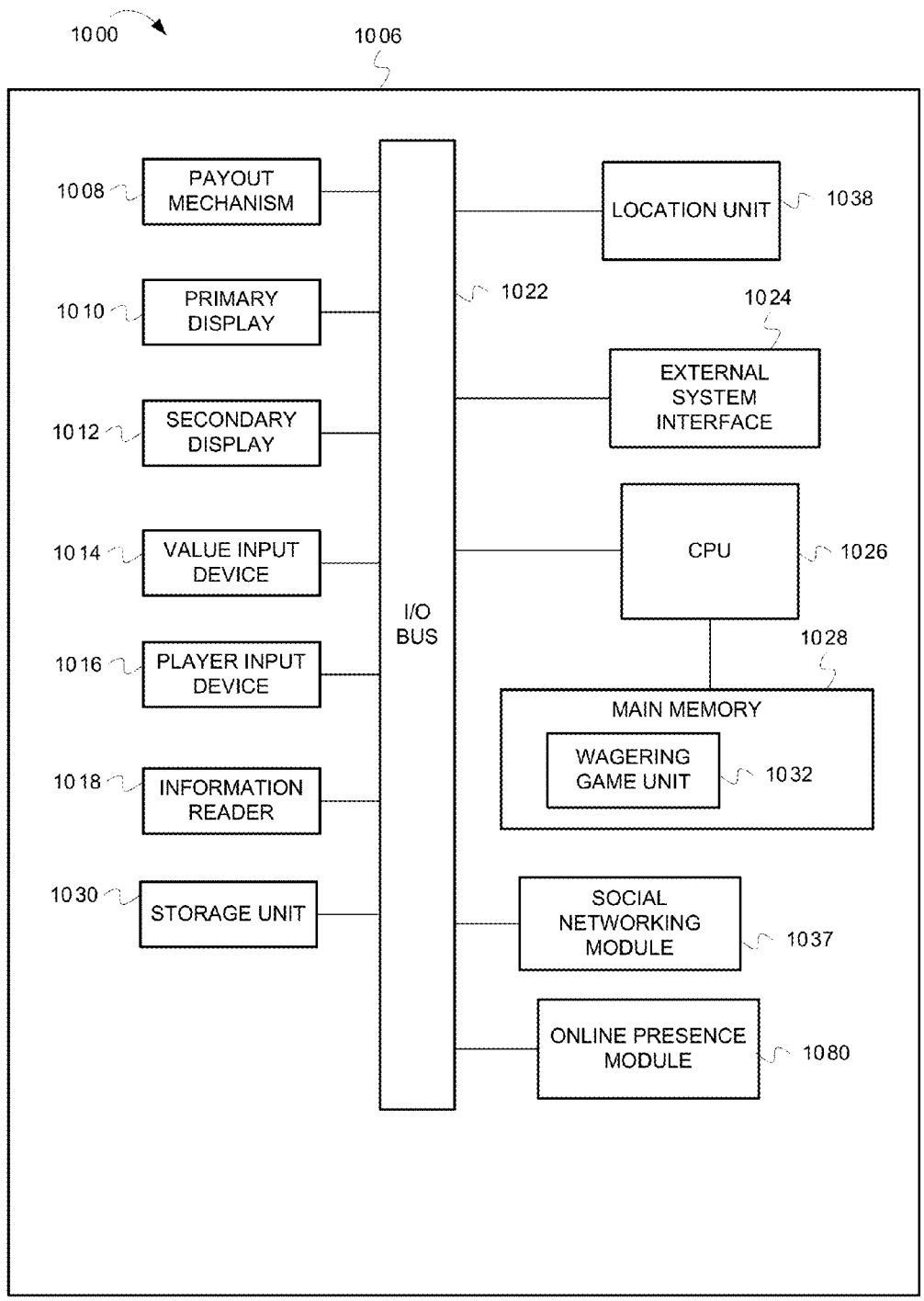
FIG. 10 depicts an illustration of a wagering game machine architecture, according to some embodiments.

FIG. 3 depicts a flowchart illustrating for providing an online presence for a wagering game machine, according to some embodiments. The operations of a flowchart 300 are described in reference to FIGS. 1-2. In this example, the operations of the flowchart 300 are performed by an online presence module that is within the wagering game machine 104. For example, the online presence module can be software being executed by a processor in the wagering game machine 104. Example architectures having the online presence module are illustrated in FIGS. 9-10, which are described in more detail below. The operations of the flowchart 300 begin at block 302.

At block 302, the online presence module creates an online presence for a wagering game machine. With reference to FIG. 1, the online presence module creates an online presence for the wagering game machine 104. In particular, the online presence module can use APIs for accessing the different online channels in creating the online presence. Using the APIs, the online presence module can create accounts for the different online channels (e.g., a social network account, a microblogging account, etc.), thereby creating an online presence for the wagering game machine 104. Operations of the flowchart 300 can continue along two different paths (the operations in these two paths can be performed serially or in parallel). After the operations at block 302, operations can continue at block 304 and 308.

At block 304, the online presence module determines that wagering game activity has occurred at the wagering game machine. With reference to FIG. 1, the online presence module determines that some type of wagering game activity (e.g., player login, reel spin, jackpot win, etc.) has occurred at the wagering game machine 104. Operations of the flow chart 300 continue at block 306.

At block 306, the online presence module determines whether to publish wagering game activity to the online presence. With reference to FIG. 1, the online presence module makes this determination for the wagering game machine 104. As described above, each wagering game machine can have its own personality that is defined based on the theme of the game playable thereon, its physical location, etc. The machine's personality can then determine, at least in part, the type of information to publish for its online presence. For example, one wagering game machine's personality can require publishing of: 1) wins above $50,000, 2) the number of times the max button is selected, etc. Whereas, a second wagering game's personality can require publishing of: 1) wins above $500, 2) any progressive wins, etc. If the wagering game activity is to be published, operations of the flowchart 300 continue at block 308. Otherwise, operations of the flowchart 300 return to block 304 to determine a next wagering game activity has occurred at the wagering game machine.

At block 308, the online presence module publishes wagering game activity to the online presence. With reference to FIG. 1, the online presence module publishes the wagering game activity for the wagering game machine 104 to one or more of the online channels 114-118. In particular, the online presence module can use Application Programming Interfaces (APIs) for accessing the different online channels for the online presence. Using the APIs, the online presence module can transmit data regarding the wagering game activity over the network 108 to one or more of the social network server 120, the microblogging server 122, and the URL-based website server 124. As described above, the decision of which online channel to publish can be based on the personality of the wagering game machine 104. Operations of the flowchart 300 continue at block 309.

At block 309, the online presence module determines whether the publishing of wagering game activity to the machine's online presence is completed. For example, the online presence module can stop publishing if a network connection for publishing is unavailable, if the wagering game machine is rebooted, or a configuration is updated to preclude publication of wagering game activity to the online presence. If the publish is complete, the operations for this path of the flowchart 300 are complete. Otherwise, operations of the flowchart 300 return to block 304 to determine a next wagering game activity has occurred at the wagering game machine.

At block 310, the online presence module determines whether to subscribe to an online presence of other wagering game machines. With reference to FIG. 1, the wagering game machine 104 can subscribe (e.g., "friend" on a social network) to the wagering game machine 106. The decision of whether to subscribe to other wagering game machines can be based on the personality of the wagering game machine (e.g., theme of the wagering game, the physical location, etc.). For example, the wagering game machine 104 can subscribe to other wagering game machines having a same wagering game theme, other wagering game machines in a same wagering game establishment, other wagering game machine having a same wagering game theme across all wagering game establishments for a given city or region, etc. Also, a physical wagering game machine at a brick-and-mortar wagering game establishment can follow the online presence of a virtual wagering game machine, or vice versa. Accordingly, the feeds from the online presence of the wagering game machine 106 could be published on the feed for the wagering game machine 104. Therefore, a person viewing the online presence of the wagering game machine 104 could also see the feed updates for the wagering game machine 106. With reference to FIG. 2, see examples of the status feeds of Mach_2, Mach_50, and Mach_8 being shown on the social network profile 242 for a social network account for the wagering game machine 104. If it is determined that the wagering game machine is not to subscribe to the online presence of other wagering game machines, operations continue at block 310 where another determination is made of whether to subscribe to the online presence of other wagering game machines. Otherwise, operations continue at block 312.

At block 312, the online presence module subscribes to the online presence of other wagering game machines. In particular, the online presence module can use APIs for subscribing to the different online channels for the online presence of other wagering game machines. Using the APIs, the online presence module can use request subscription to the different online channels (e.g., a social network account, a microblogging account, etc.) for the other wagering game machines. For example, the online presence module can make friend requests on the social network for those wagering game machines in a same brick-and-mortar wagering game establishment or virtual casino that have a wagering game with a same theme. Operations continue at block 310 where another determination is made of whether to subscribe to the online presence of other wagering game machines. These operations along this path of the flowchart 300 continue to allow subscription to the online presence of other wagering game machines at later points in time.

Integrating Social Networking and Wagering Systems

Introduction

Social communication is on the rise. Internet users are enjoying a proliferation of social networking mechanisms (e.g., social networking websites, online chats, blogging, social networking applications, etc.) that are appearing online in vast quantities. Many of those Internet users are also wagering game enthusiasts. Wagering games are also expanding in popularity. Many wagering game enthusiasts are demanding greater access to wagering games and content related to wagering games, especially content that includes social networking. As stated previously, some wagering game companies have created online wagering game websites that provide a way for wagering game enthusiasts to play wagering games while connected to the Internet (e.g., via a web browser). Some online wagering game websites provide various features, such as some social networking functionality. Social networking features, for example, allow wagering game players ("players") to create user accounts with one or more unique identifiers that represent an online persona. One example of a unique identifier is an "avatar." Avatars are graphical, "cartoon-like" depictions of a social networking persona. These online personas and associated avatars add to the fun of belonging to a social network. Many online casinos, however, present an unsatisfactory wagering game experience to players who enjoy a more integrated gaming experience.

Some embodiments of the inventive subject matter, describe examples of integrating social networking and wagering systems for a network wagering venue (e.g., an online casino, a wagering game website, a wagering network, etc.). Embodiments can be presented over any type of communications network (e.g., public or private) that provides access to wagering games, such as a website (e.g., via wide-area-networks, or WANs), a private gaming network (e.g., local-area-networks, or LANs), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

In some embodiments herein a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Figure 4:
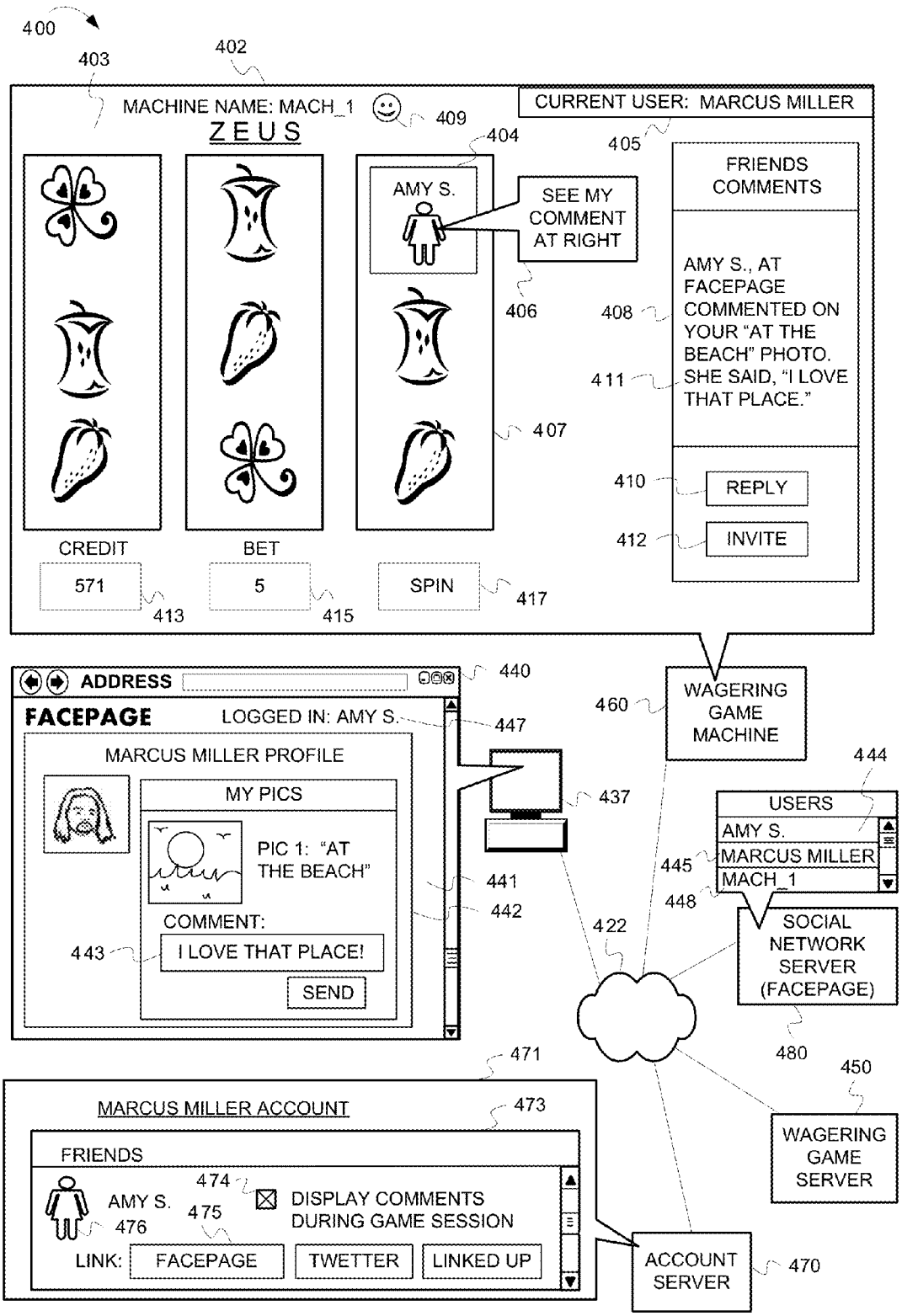
FIG. 4 depicts an illustration of controlling social interactions between social network accounts and wagering game player accounts during a wagering game session, according to some embodiments.

FIG. 4 is a conceptual diagram that illustrates an example of controlling social interactions between social network accounts and wagering game player accounts during a wagering game session, according to some embodiments. In FIG. 4, a wagering game system ("system") 400 includes a wagering game machine 460 connected to a wagering game server 450 via a communications network 422. Also connected to the communications network 422 are a computer 437, a social network server 480, and an account server 470. The wagering game machine 460 is configured to present a wagering game application 403 in a wagering game display 402. The wagering game application 403 can include wagering game elements, such as one or more reels 407, a credit meter 413, a bet meter 415, a spin button 417, etc. The wagering game machine 460 can also access a player account 471 (e.g., Marcus Miller's player account) stored on the account server 470. The player account 471 can log in to the wagering game machine 460 as indicated by player login information 405.

The computer 437 can access a social network account 444 (e.g., Amy S.'s social network account) stored on the social network server 480. The social network server 480 can host a social networking website 441 (e.g., the fictional social networking website "Facepage"). The social network server 480 can include other devices, servers, mechanisms, etc., that provide functionality (e.g., controls, web pages, applications, etc.) that social network users can use to connect to the social networking website 441 and utilize social networking website features (e.g., communications mechanisms, applications, etc.). The computer 437 can present the social networking website 441 via a web browser application ("web browser") 440. The social network account 444 (e.g., Amy S.'s social network account) can log in to the social networking website 441 through the computer 437, as indicated by social network user login information 447. The computer 437 can present the social networking website 441 in the web browser 440.

The social networking website 441 can present social networking profiles for social networking contacts (e.g., friends, subscribers, etc.) that socialize with the owner of the social network account 444 (e.g., with Amy S.) via the social networking website 441. The social network account 444 can have a number of social networking contacts. For example, the social network user, Amy S., can link the social network account 444 to a separate social network account 445 for a second social network user, Marcus Miller, via the social network server 480. Likewise, the social network account 445 for Marcus Miller is linked to the social network account 444 for Amy S. It should be noted that the social network account 445 is a different account from the player account 471, although Marcus Miller, the user, may own and control both the player account 471 and the social network account 445. Further, although the social network account 444 and the social network account 445 may be linked, they may be linked only as social contacts, so that the users Amy S. and Marcus Miller can receive social communications from and about each other, but each user maintains separate control of his or her own social network account.

On the account server 470, the player account 471 can include a social networking contact list 473 that can show one or more social-network contact accounts from various social networking websites and services. For example, the social networking contact list 473 includes linking controls 475 that link or otherwise associate the social network account 444 (for the social network user Amy S) to the player account 471. Once linked, the player account 471 can show information that identifies the social network account 444 (such as an avatar identifier 476 for Amy S.). The player account 471 can also include options, settings, preferences, etc. for presenting social communications from the social network account 444 during wagering games. For example, the player account 471 includes a comment display control 474 that, when activated, will show social communications from the social network account 444. For example, when the social network account 444 views a profile page 442 for the social network account 445 (e.g., for Marcus Miller's Facepage profile page), a comment feature 443 can present options for the social network account 444 to comment about the social network account 445 (e.g., for Amy S. to comment on a picture posted by Marcus Miller on the profile page 442). The social network server 480 can send a comment made by the social network account 444 (e.g., "I love that place!" sent by Amy S.) to the account server 470 and/or the wagering game server 450. The account server 470 and/or the wagering game server 450 can receive the comment and present it in the wagering game machine 460 to present in the wagering game display 402.

The wagering game machine 460 can present the comment in different ways. In one embodiment, the wagering game machine 460 presents the comment in a comment application 408. The comment application 408 may be an integrated feature of the wagering game application 403, or it may be a separate application (e.g., a plug-in, or other "secondary" independent application) that presents comments separate from the wagering game application 403. The comment application 408 can present a comment copy 411 as well as controls to reply to the comment (e.g., reply control 410 to reply to Amy S.) or invite the social network account 444 to participate in gaming activity (e.g., an invite control 412 to invite Amy S. to play a wagering game).

In another embodiment, the wagering game application 403 may communicate with the comment application 408 so that the wagering game application 403 knows that there is a comment. The wagering game application 403 can present notifications of the comment (e.g., via comment notification 406) or integrate the comment (as well as elements of the social network account 444 that made the comment) into the wagering game activity. For example, the wagering game application 403 can present a friend identifier image 404, which can include a name and an avatar for the social network account 444 (e.g., for Amy S.), into the one or more reels 407 or any other playing element for the wagering game application 403.

In some embodiments, as described in further detail herein, the wagering game machine 460 can also have a social network account 448, and social networking identifiers (e.g., a name "Mach_1," an avatar 409, etc.), so that the player account 471, and the social network accounts 444 and 445, can interact and socialize with the wagering game machine 460.

Although FIG. 4 describes some embodiments, the following sections describe many other features and embodiments.

Example Operating Environments for Integrated Social Networking

This section describes example operating environments and networks and presents structural aspects of some embodiments. More specifically, this section includes discussion about wagering game system architectures.

Wagering Game System Architecture

Figure 5:
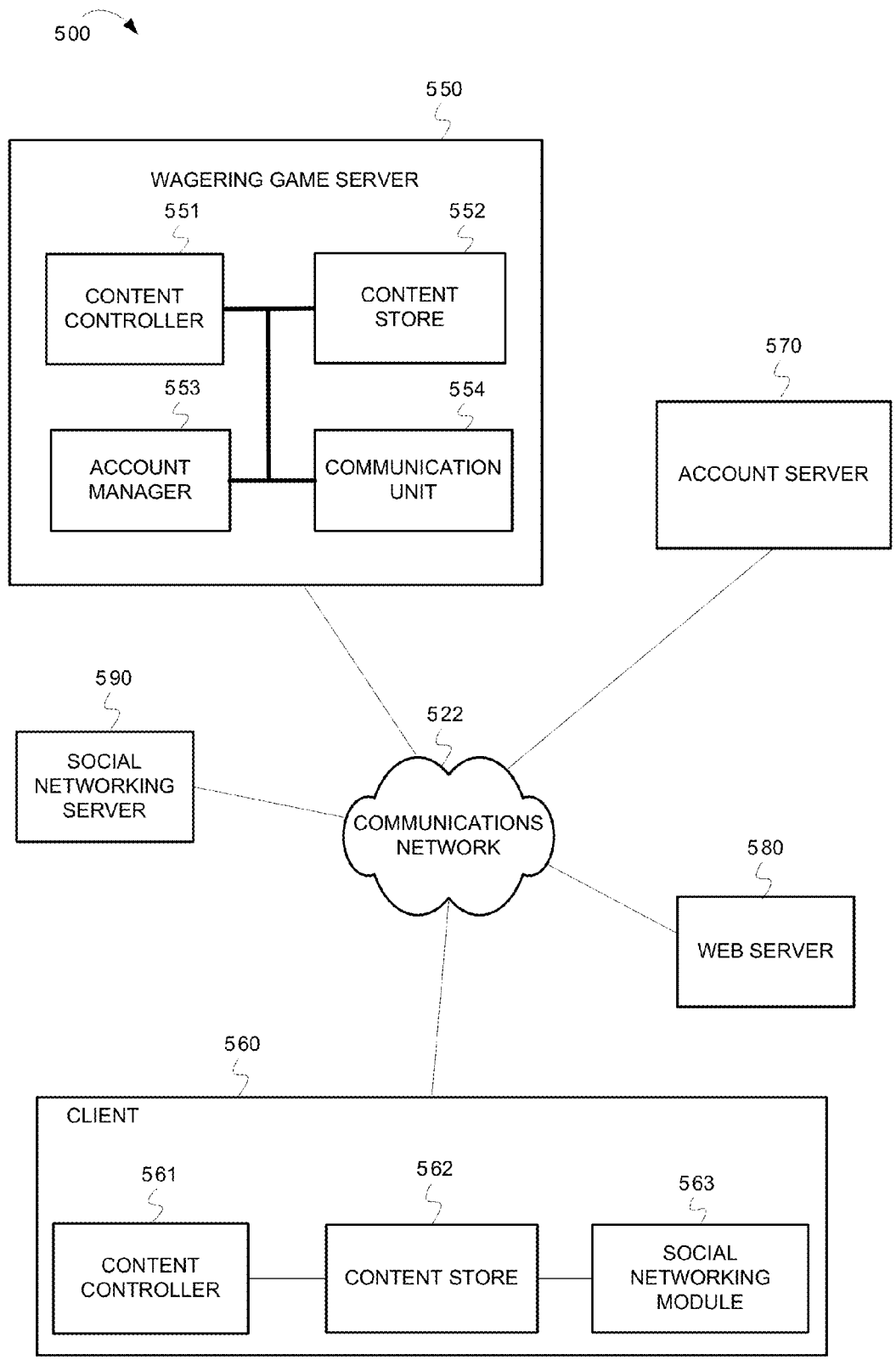
FIG. 5 depicts an illustration of a wagering game system architecture, according to some embodiments.

FIG. 5 is a conceptual diagram that illustrates an example of a wagering game system architecture 500, according to some embodiments. The wagering game system architecture 500 can include an account server 570 configured to control user related accounts accessible via wagering game networks and social networks. The account server 570 can store wagering game player account information such as account settings (e.g., settings related to social networking contacts, settings related to social communications, etc.), preferences (e.g., player preferences regarding social network accounts and features, player preferences regarding levels of social communication by wagering game machines, player preferences regarding award types, player preferences related to virtual assets, etc.), player profile data (e.g., name, avatar, screen name, etc.), and other information for a player's account (e.g., financial information, account identification numbers, virtual assets, social networking contact information, etc.). The account server 570 can contain lists of social networking contacts referenced by a player account. The account server 570 can also provide auditing capabilities according to regulatory rules. The account server 570 can also track performance of players, machines, and servers.

The wagering game system architecture 500 can also include a wagering game server 550 configured to control wagering game content, provide random numbers, and communicate wagering game information, account information, and other information to and from a client 560. The wagering game server 550 can include a content controller 551 configured to manage and control content for the presentation of content on the client 560. For example, the content controller 551 can generate game results (e.g., win/loss values), including win amounts, for games played on the client 560. The content controller 551 can communicate the game results to the client 560. The content controller 551 can also generate random numbers and provide them to the client 560 so that the client 560 can generate game results. The wagering game server 550 can also include a content store 552 configured to contain content to present on the client 560. The wagering game server 550 can also include an account manager 553 configured to control information related to player accounts. For example, the account manager 553 can communicate wager amounts, game results amounts (e.g., win amounts), bonus game amounts, etc., to the account server 570. The wagering game server 550 can also include a communication unit 554 configured to communicate information to the client 560 and to communicate with other systems, devices, and networks.

The wagering game system architecture 500 can also include the client 560 configured to present wagering games and receive and transmit information to integrate social networking and wagering systems. The client 560 can be a computer system, a personal digital assistant (PDA), a cell phone, a laptop, a wagering game machine, or any other device or machine that is capable of processing information, instructions, or other data provided via a communications network 522. The client 560 can include a content controller 561 configured to manage and control content and presentation of content on the client 560. The client 560 can also include a content store 562 configured to contain content to present on the client 560. The client 560 can also include a social networking module 563 configured to communicate with social network accounts associated with wagering game player accounts. The social networking module 563 can also be configured to present events (e.g., achievements, machine occurrences, etc.) associated with the wagering game player account for a wagering game session and communicate the events to the social network account associated with the wagering game player account. The social networking module 563 can also be configured to enable the client 560 to be a social networking contact to the social network account. The client 560 can, thus, perform social communications and other related social networking activities that social networking contacts perform on social networking websites (e.g., link to social network accounts, make comments, build relationships, etc.). The social networking module 563 can interact with social networking websites as a pseudo-user. The social networking module 563 can provide unique identification for the client 560 such as a name, an avatar, and other identifying features that are associated with a social network account. The social networking module 563 can also convey social communications made from social networking communication mechanisms (e.g., social communication features on a social networking website or associated with a social communication application) to the client 560. The social networking module 563 can present the social communications during a wagering game session.

The wagering game system architecture 500 can also include a social network server 590 configured to host social network accounts, provide social networking content, control social networking communications, store associated social networking contacts, etc.

The wagering game system architecture 500 can also include a web server 580 configured to control and present an online website that hosts wagering games. The web server 580 can also be configured to present multiple wagering game applications on the client 560 via a wagering game website, or other gaming-type venue accessible via the Internet. The web server 580 can host an online wagering website and social networking. The web server 580 can include other devices, servers, mechanisms, etc., that provide functionality (e.g., controls, web pages, applications, etc.) that web users can use to connect to a social network website and utilize social networking and website features (e.g., communications mechanisms, applications, etc.). The web server 580 can also be configured to communicate with the client 560 and present data from the client 560 as social communications on the social networking website.

Each component shown in the wagering game system architecture 500 is shown as a separate and distinct element connected via the communications network 522. However, some functions performed by one component could be performed by other components. For example, the wagering game server 550 can also be configured to perform functions of the social networking module 563, and other network elements and/or system devices. For instance, the wagering game server 550 can communicate with the client 560 throughout a wagering game session and connect the wagering game player account to one of its social network accounts. The wagering game server 550 can control communications between the wagering game player account and a connected social network account during a wagering game session. The wagering game server 550 can also control communications between the wagering game player account and a machine-owned social network account, which represents a wagering game machine (e.g., the client 560 can be a wagering game machine in one embodiment) that the wagering game player account uses during the wagering game session.

Furthermore, the components shown may all be contained in one device, but some, or all, may be included in, or performed by, multiple devices as in the configurations shown in FIG. 5 or other configurations not shown. For example, the account manager 553 and the communication unit 554 can be included in the client 560 instead of, or in addition to, being a part of the wagering game server 550. Further, in some embodiments, the client 560 can determine wagering game outcomes, generate random numbers, etc., instead of, or in addition to, the wagering game server 550.

As mentioned previously, in some embodiments the client 560 can take the form of a wagering game machine. Examples of wagering game machines can include floor standing models, handheld mobile units, bar-top models, workstation-type console models, surface computing machines, etc. Further, wagering game machines can be primarily dedicated for use in conducting wagering games, or can include non-dedicated devices, such as mobile phones, personal digital assistants, personal computers, etc.

In some embodiments, clients and wagering game servers work together such that clients can be operated as thin, thick, or intermediate clients. For example, one or more elements of game play may be controlled by the client or the wagering game servers (server). Game play elements can include executable game code, lookup tables, configuration files, game outcome, audio or visual representations of the game, game assets, or the like. In a thin-client example, the wagering game server can perform functions such as determining game outcome or managing assets, while the clients can present a graphical representation of such outcome or asset modification to the user (e.g., player). In a thick-client example, the clients can determine game outcomes and communicate the outcomes to the wagering game server for recording or managing a player's account.

In some embodiments, either the client or the wagering game server(s) can provide functionality that is not directly related to game play. For example, account transactions and account rules may be managed centrally (e.g., by the wagering game server(s)) or locally (e.g., by the client). Other functionality not directly related to game play may include power management, presentation of advertising, software or firmware updates, system quality or security checks, etc.

Furthermore, the wagering game system architecture 500 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations for Integrated Social Networking

This section describes operations associated with some embodiments. In the discussion below, some flowcharts are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flowchart.

Figure 6:
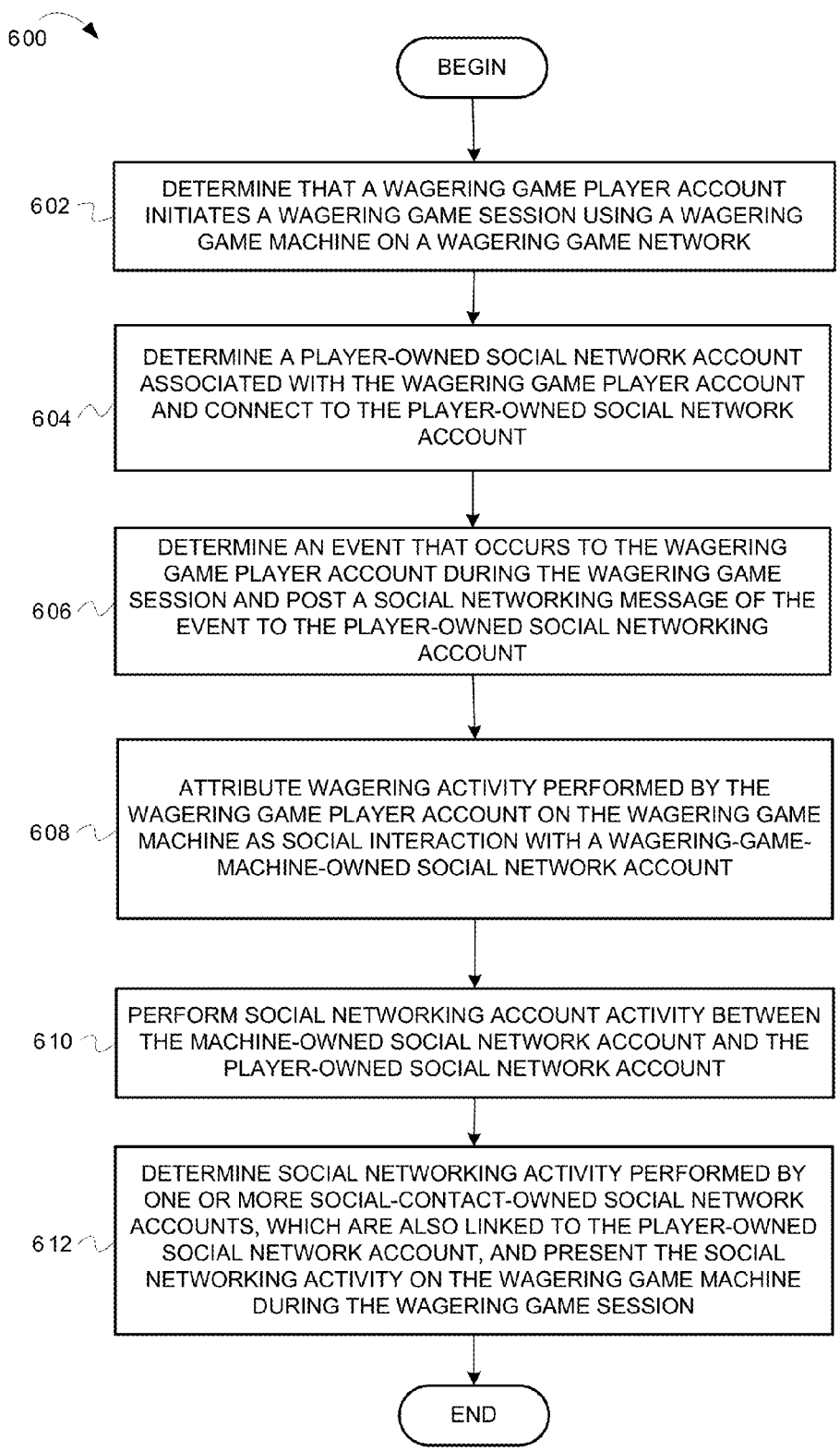
FIG. 6 depicts a flowchart illustrating integrating social networking interactions and wagering game systems, according to some embodiments.
Figure 7:
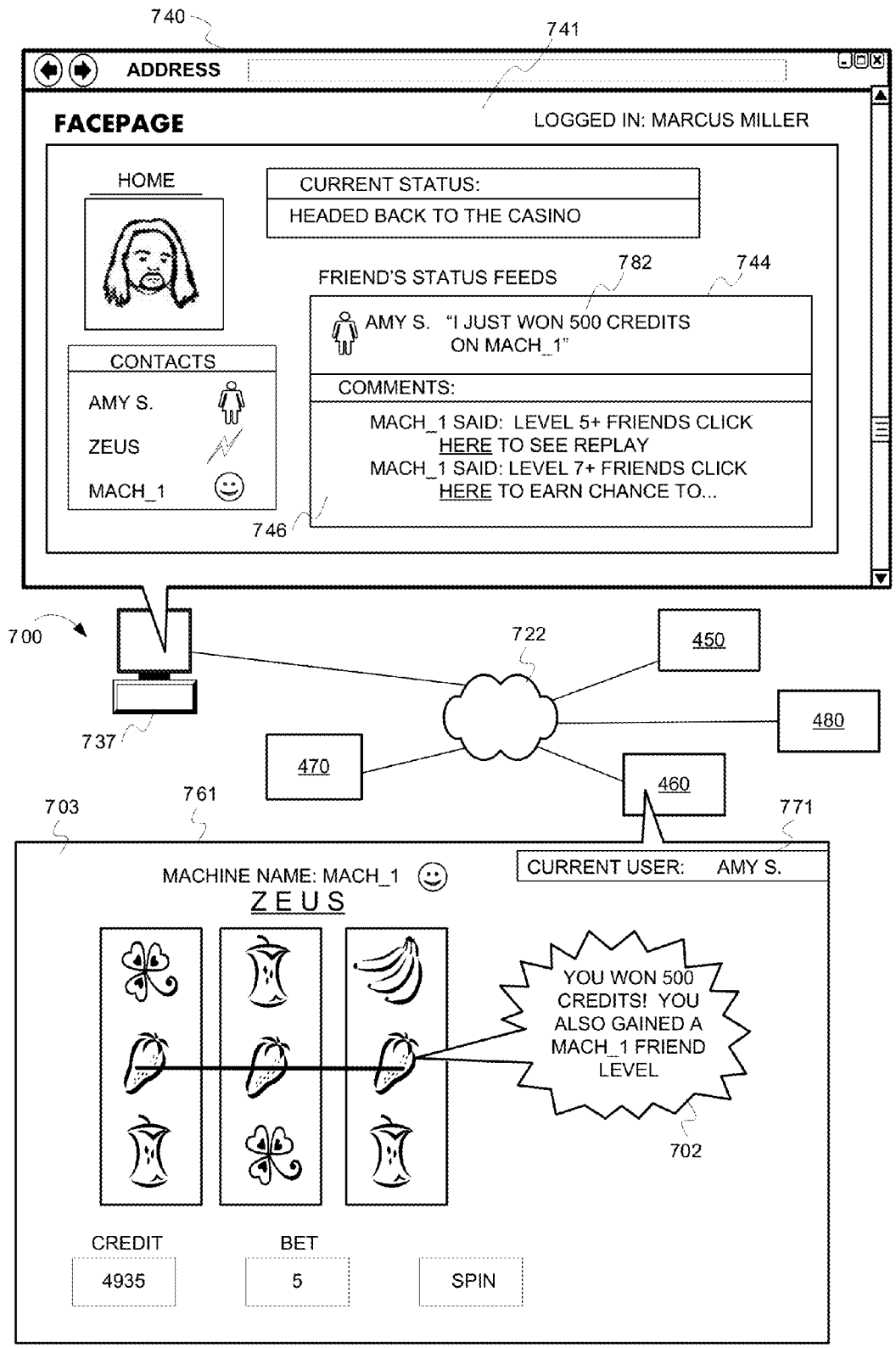
FIG. 7 depicts an illustration of controlling social networking interactions between player accounts and wagering game machines, according to some embodiments.
Figure 8:
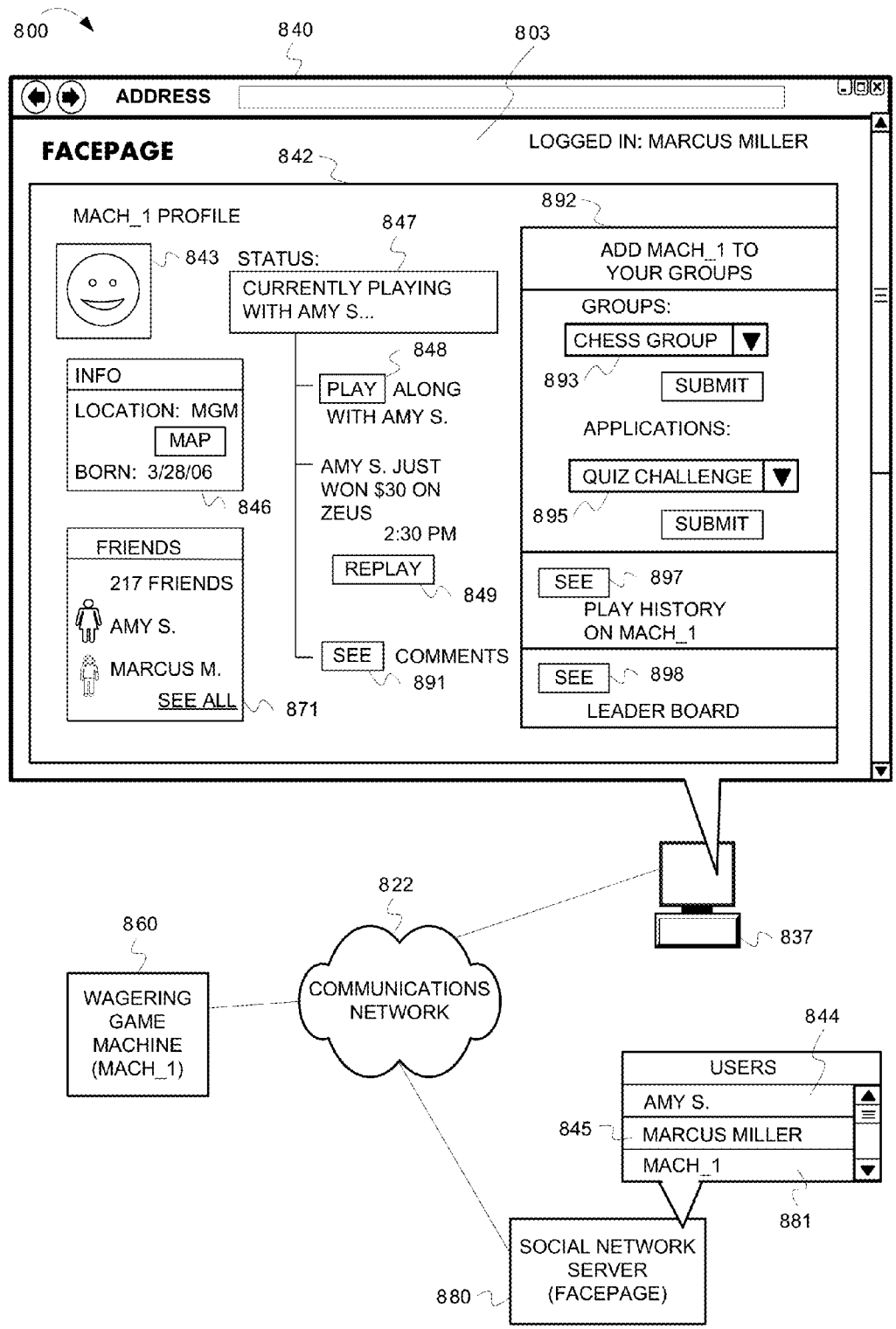
FIG. 8 depicts an illustration of controlling social network accounts for wagering game machines, according to some embodiments.

FIG. 6 depicts a flowchart 600 illustrating integrating social networking interactions and wagering game systems, according to some embodiments. FIGS. 4, 7, and 8 are conceptual diagrams that help illustrate the flow of FIG. 6, according to some embodiments. This description will present FIG. 6 in concert with FIGS. 4, 7 and 8. In FIG. 6, the flow 600 begins at processing block 602, where a wagering game system ("system") determines that a wagering game player account initiates a wagering game session using a wagering game machine on a wagering game network. The wagering game machine can include any of the wagering game machine types specified herein as well as other wagering game related devices that utilize or implement wagering game machines, such as a networked gaming table (e.g., a blackjack table, a poker table, etc.), a mobile gaming machine docking station, a gaming kiosk, etc.

The flow 600 continues at processing block 604, where the system determines a player-owned social network account associated with the wagering game player account and connects to the player-owned social network account. The player-owned social network account can be associated with a social network. In some embodiments, a wagering game server (or other device) on the wagering game network can access the wagering game player account and look for a listing of one or more listed social network accounts that belong to the wagering game player account. The wagering game server can select any one, or more, of the listed social network accounts. The listed social network accounts can be associated with social networks that are separate from the wagering game network. For example, the social networks can be hosted by social network servers separate from, and/or external to, the wagering game network. Nevertheless, a wagering game server (or other device) on the wagering game network can access the listed social network account using social-network-account logon information (e.g., a social networking website address, a user name, a password, etc.) stored in the wagering game player account. The wagering game server can use the social-network-account logon information to connect, or logon, to the player-owned social network account.

The flow 600 continues at processing block 606, where the system determines an event that occurs to the wagering game player account during the wagering game session and posts a social networking message of the event to the player-owned social networking account. In some embodiments, the event can be an achievement by the wagering game player account for a wagering game, an availability of a wagering game machine, feedback (e.g., humorous commentary) from the wagering game machine, etc. In one example, the event can specify that a wagering game machine (e.g., Zeus machine) is available and can notify players of the wagering game machine's availability. Further, the wagering game machine can notify a player's friends that a machine next to a player is open and can invite friends. FIG. 4 is an illustration of controlling social networking interactions between player accounts and wagering game machines, according to some embodiments. In FIG. 4, a wagering game system ("system") 400 includes a wagering game machine 460 connected to an account server 470, and a wagering game server 450 via a communications network 422. The wagering game machine 460 includes a wagering game display 461 that presents a wagering game 403. In the wagering game, a wagering game player account ("player account") 471 accomplishes a wagering game win. The wagering game machine 460 presents a congratulatory message 402 that indicates that the player account 471 wins a certain amount. The system 400 also includes a computer 437 connected a social network server 480 via the communications network 422. The computer 437 presents a web browser 440. The web browser 440 presents a social network website 441 hosted by the social network server 480. The system 400 transfers a message of the win to the social network server 480, which presents a status indicator comment 482 about the player account's win in a status feed console 444.

Returning to FIG. 6, the system can post the social networking message of the event according to a personality (e.g., aggressive, sophisticated, upbeat, etc.) that has been programmed into a wagering game machine. The wagering game machine can refer to personality rules that dictate a degree of friendliness, aggressive, or other personality behavioral traits. The system can provide options for an operator to set the wagering game machine's personality rules. The system can set the personality rules on other factors instead of, or in addition to, operator preferences, including, but not limited to, maintenance needs, locations in a casino, availability in a tournament, etc.

The system can post the social networking message using a social network messaging application for the social network. The system can provide the social networking message to the social network messaging application of the social network, and instruct the social network messaging application to transmit the social networking message. For example, the system can update a status on Facebook™, present a tweet on Twitter™, generate a comment on MySpace™, create a post on a blog website, or use any other social networking messaging mechanism available on social networking websites and their social communication applications.

In some embodiments, the social networking messaging application is provided by a social networking website, which the system can utilize directly and indirectly. For example, the system can plug in a version of the social network messaging application directly into a gaming application and use the plug-in to post comments directly to a social networking website. In other embodiments, however, the system can indirectly connect to the social networking website by sending instructions to a social network server to post the social networking message. The social network server can send a verification message to the wagering game player account to authorize the posting of the message before the message is posted. For example, the social network server can send a verification text message to a player's cell phone to verify, or authorize, access by the wagering game machine and/or to enable posting activity. If the player authorizes the access, the player's cell phone can return an authorization message, which the social network server can then use as authorization to post the message on the social networking website.

In some embodiments, the system can store and use player-configured event-posting settings that report, or filter, different types of events. The types can refer to win levels, subject matters, game themes, or any other discernible property or characteristic of the event. The system can determine an event type associated with the event and determine that the event type complies with the player-configured event-posting settings. The system can then generate the social networking message of the event, and present the social networking message on the social network. In some embodiments, the system can store the player-configured event-posting settings with a social network messaging application, with the wagering game player account, or with the player-owned social network account.

In some embodiments, the system can also provide a selectable object (e.g., a link, a button, a video player, etc.), along with the social networking message, that will present a replay of the event when a user selects (e.g., clicks on) the selectable object. In some embodiments, the system can receive comments from social networking contacts associated with the social network account and communicate the comments to the wagering game network to present on a wagering game machine associated with the wagering game session. In another example, the system can incorporate the comments into the wagering game (e.g., present the comments on the reels, include images of social networking contacts who made the comments, etc.). Additionally, the system can reward friends for commenting. In some embodiments, the system can receive comments from a wagering game player account, via the wagering game machine, and post those comments using the social network messaging application.

The flow 600 continues at processing block 608, where the system attributes wagering game activity performed by the wagering game player account on the wagering game machine as social interaction with a machine-owned social network account. In some embodiments, the system can first link the wagering-game-machine-owned (machine-owned) social network account to the player-owned social network account, as exemplified in FIG. 8. FIG. 8 is an illustration of controlling social network accounts for wagering game machines, according to some embodiments. In FIG. 8, a wagering game system ("system") 800 includes a computer system 837 connected to a social network server 880 via a communications network 822. The system 800 also includes a wagering game machine 860. The wagering game machine 860 can have identifying information (e.g. a machine name, "Mach_1," an avatar 843, etc.) that the system 800 uses to sign-up the wagering game machine 860 for a social network account 881 hosted by the social network server 880. The social network server 880 can host a social networking website 803 as well as other social network accounts 844 (for a user, Amy S.) and 845 (for a user, Marcus Miller). The computer 837 can present the social networking website 803 in a web browser 840. The social networking website 803 can present a social network profile 842 for the social network account 881. The social network account 881 may also be referred to as a "machine-owned" social network account 881 because it belongs to, or is owned by, the wagering game machine 860. The social network accounts 844, 845 may be referred to as "player-owned" social network accounts 844, 845 because they belong to, or are owned by, wagering game player accounts. The social networking website 803 can present the machine-owned social network account 881 as a linkable social contact (e.g., a friend, a contact, a follower, etc.), on the social networking website 803. The system 800 can link the machine-owned social network account 881 to the player-owned social network accounts 844, 845 using a social-contact linking feature from a social network application (e.g., a linked friends feature 871) on the social networking website 803. Some examples of linking features on some known social network websites include the friend connection feature for Facebook™ and the follower subscription feature for Twitter™. In some embodiments, the system 800 can link, for example, the player-owned social network account 845, for the user Marcus Miller, to the machine-owned social network account 881, without any required social interaction by the user Marcus Miller, or by Marcus Miller's wagering game player account, other than a request by Marcus Miller to link the to the machine-owned social network account 881. In some embodiments, however, the system 800 may require a certain level of activity or social interaction before the system links the player-owned social network account 845 to the machine-owned social network account 881. For example, system 800 may only perform the link if the user Marcus Miller logs on to the wagering game machine 860, using a wagering game player account and plays (i.e., places a wager) on the wagering game machine 860.

Returning to FIG. 6, in some embodiments, a wagering game machine can have a programmed personality which the wagering game machine use to perform social interactions with the wagering game player, social network accounts, etc. For example, the wagering game machine can appear to feel bad and possibly de-friend a social contact account for neglecting it or for playing on other wagering game machines.

In some embodiments, the system can detect a pre-defined wagering activity by a wagering game player account and use it as a measure of social interaction with the wagering game machine, establish a level of social status, or in other words, build a friendship, with the wagering game machine. For example, in FIG. 7, the system 700 can determine a significance metric, or degree of significance (e.g., significance in value, amount, duration, etc.), for the wagering activity. The system 700 can determine whether the significance metric of the wagering activity (e.g., the wagering game win amount) meets one or more pre-defined levels of social interaction for the wagering game machine 760. The pre-defined levels of social interaction can be related to level of social status to the wagering-game-machine-owned social network account. If the wagering activity meets the pre-defined levels of social interaction, the wagering game machine 760 can assign (i.e., increase) a level of social status, or friendship level, for a social network account associated with the player account (i.e., increase a friendship level for Amy S.'s Facepage account because Amy S.'s player account, player account 771, won, as indicated in the congratulatory message 702). Other examples may include increasing a level of social status if the player account 771 pays a certain amount of money on the wagering game machine 760 over time, increasing a level if the player recruits a certain number of friends to play the wagering game machine 760, and so forth.

In some embodiments, the system 700 can attribute the social interaction with the wagering game machine by providing social network benefits, or rewards, associated with a machine-owned social network account. For instance, as indicated in a comments section 746, the system 700 can reward a player-owned social network account with benefits (e.g., a video replay of Amy S.'s win for any social network account that has a friendship level of "5" or above) for the social interaction performed by the player account 771 with the wagering game machine 760. In other examples, the system 700 can provide monetary awards (e.g., spins, coins, credits, etc.) and/or non-monetary awards (e.g., sweepstakes entries, points, coupons, links to new friends, invitations to join groups, etc.). In some embodiments, the system 700 can provide reward for varying levels of social interaction performed by a wagering game player account. The system 700 can increase the rewards in value as the wagering game player account reaches higher levels of social interaction with the wagering game machine 760. Therefore, in some embodiments, the more the wagering game player account plays on the wagering game machine 760, the more the system 700 will rewards the wagering game player account or a player-owned social network account associated with the wagering game player account.

Returning to FIG. 6, in some embodiments, the wagering game player account can link or introduce friends to the wagering game machine. The system can reward friends for making introductions as well as for recruiting others to link to the wagering game machine's social network account. For instance, the system can reward introductions or links by making the linked friends eligible to be integrated into wagering game play (e.g., via a reel element substitution). In some embodiments, the system can provide social networking awards that affect the player-owned social network account on the social network and/or provide gaming awards that affect the wagering game player account on the wagering game network.

The flow 600 continues at processing block 610, where the system performs social networking account activity between the machine-owned social network account and the player-owned social network account. In some embodiments, the system performs the social networking account activity on behalf of the wagering game machine. A casino-controlled device (e.g., the wagering game machine, a wagering game server, an account server, etc.) can be programmed to perform social networking account activity for the machine-owned social network account. In some embodiments, the casino-controlled device works in conjunction with a social network server and/or a social network application on the social network server that receives instructions from the casino-controlled device to perform the social networking account activity on the social network server. The system can socially communicate with the machine-owned social network account, with any linked social network accounts of the machine-owned social network account (i.e., the player-owned social network account), or with any other social network account with which the social network allows communication (e.g., social-network contacts of the player-owned social network account). The system can post comments on social network websites using social networking communication features (e.g., Facebook™ comments, Twitter™ tweets, Blogger™ posts, etc.). The wagering game machine can have identifying information (e.g. a machine name, an avatar, etc.) assigned to it, which the system can use to perform social activities on behalf of the wagering game machine (e.g., post an avatar on machine-owned social networking profiles, use a machine name to identify social networking communications made by the machine-owned social network account, etc.). For example, in FIG. 8, the system 800 can present a status message 847 about what the wagering game machine 860 is doing (e.g., playing a game with Amy S.). The social network account 844 can read the status message 847 from the social network profile 842 for the social network account 881 when the social network account 844 logs on to the social network website 803.

In some embodiments, the system can perform the social networking account activity using social network applications and features on a social networking website and/or by sponsoring a social networking application on the social networking website. For example, in FIG. 8, the system 800 can utilize a comments feature 891 for the social network website. In another embodiment, the system 800 can integrate with social network applications indicated in an applications console 892, or elsewhere on the social network website 803. The social network applications can provide levels of benefits (e.g. levels of information, access, rewards, privileges, etc.) for the social network applications. For example, the system 800 can make friend's accounts (i.e., social contact accounts linked to a player-owned social network account) eligible to win sweepstakes offered by a sweepstakes application on the social networking website 803. In another example, the system 800 can present statistics in a statistical or information application or features. For instance, the system 800 can determine statistics for the wagering game machine 860, such as a popularity of the wagering game machine by all players or, specifically, by one or more linked social network accounts that are linked to the machine-owned social network account 881. The system 800 can review a machine's play history (e.g., review who has played the wagering game machine and when), and submit the play history to a popularity-tracking social network application 897 that can list the popularity of the wagering game machine 860 based on the play history. The system can also compare an individual player's history to other players' histories to generate a comparison of the popularities among individual players. The system 800 can submit the comparison to the popularity-tracking social network application 897 to present on the social network website 803. In yet another example, the system 800 can control a leader board application 898 that posts rankings of players that are performing in a gaming tournament. In another example, the wagering game machine can report information to groups 893 using group applications 895 that feed to groups of users (e.g., send a picture of a player at the wagering game machine 860 to a group of friends using a picture sharing application). Further, the wagering game machine 860 can post videos of player activities (e.g., replays, wins, etc.) using a video sharing application 849.

In some embodiments, the system 800 can present descriptive information 846 of the wagering game machine's location, history, statistics, or other properties and characteristics (e.g., how to access a wagering game machine, what the wagering game machine is paying out, etc). The descriptive information 846 can include a map application that shows a map graphic depicting the descriptive information 846.

In some embodiments, the system 800 can provide levels of benefits to the social networking applications based on degrees of wagering activity. For example, the system 800 can require that a player perform certain activities using the wagering game machine 860, or on different wagering game machines (e.g., require that the player play games at different locations, on different wagering game machines), to unlock a game application 848. The social networking website 803 and the wagering game machine 860 can report player activities and accomplishments back and forth to each other to update the game application 848 and unlock access to the game application 848, or access to different levels of the game application 848, once the player performs the activities.

The flow 600 continues at processing block 612, where the system determines social networking activity performed by one or more social-contact-owned social network accounts, which are linked to the player-owned social network account, and presents the social networking activity on the wagering game machine during the wagering game session. In some embodiments, the system can monitor the player-owned social network account for social networking communications from one or more social-contact-owned social network accounts ("friend accounts") associated with the player-owned social network account. The friend accounts can send the social networking communications using social networking communication features of the social networking website. The system can format the social networking communication for presentation on the wagering game machine, and present the communication on the wagering game machine (see FIG. 4 for an example of the system 400 presenting the comment feature 443 by the social network account 444 on the comment application 408 on the wagering game machine 460). In some embodiments, the system can present the social networking communication as part of the wagering game.

In some embodiments, the system can use social networking activity by friend accounts to affect or control the wagering game player account associated with the player-owned social contact account. For example, the system can use instructions indicated in friend accounts' comments to influence a gaming effect during the wagering game player account's wagering game session. In some embodiments, instructions indicated in friend accounts' comments can indicate likes, dislikes, preferences, or some other voting feature related to the wagering game session that would specify what the wagering game player account should do during the wagering game session (e.g., vote for the player to bet more, vote for the player to bet more lines, vote for the player to select a specific item, vote for the player to stop a reel at a certain time, etc.). The system can present the results of the vote on a display on a wagering game machine that the wagering game player account is using during the wagering game session. In some embodiments, the wagering game player account can authorize the system to enforce the results of the vote (e.g., authorize the wagering game machine to bet for the wagering game player account based on audience vote).

In some embodiments, the system can provide rewards to the friend accounts if the social networking communication is presented on the wagering game machine. For example, if a social-contact-owned social network account (i.e., a friend account) makes a comment for the player-owned social network account, the system can make the friend account eligible to be integrated into the game or be eligible for some reward. If the friend account also owns a wagering game player account, the system can make the friend account's player account eligible to receive rewards on the wagering game network.

In another example, the system can provide rewards to the wagering game player account (e.g., a promotion, a privilege, etc.) based on an amount of social networking communication received by friend accounts during the wagering game session. For example, the system can present a stacked wilds feature, which grants the wagering game player account eligibility for more wilds based on the amount of social networking activity (e.g., for every ten friend account comments, the system makes the wagering game player account eligible for another wild). In another example, the system can provides opportunities for a player to increase their chances of receiving a bonus reward or performing better in a bonus game or a wagering game (e.g., a better chance of continuing a cascade, a better chance of getting a multiplier, etc.) based on an amount of social networking communications by friend accounts.

Additional Example Operating Environments

This section describes example operating environments, systems and networks, and presents structural aspects of some embodiments.

Wagering Game Computer System

FIG. 9 is a conceptual diagram that illustrates an example of a wagering game computer system 900, according to some embodiments. In FIG. 9, the computer system 900 may include a processor unit 902, a memory unit 930, a processor bus 922, and an Input/Output controller hub (ICH) 924. The processor unit 902, memory unit 930, and ICH 924 may be coupled to the processor bus 922. The processor unit 902 may comprise any suitable processor architecture. The computer system 900 may comprise one, two, three, or more processors, any of which may execute a set of instructions in accordance with some embodiments.

The memory unit 930 may also include a social networking module 937 and an online presence module 980. The memory unit 930 can store data and/or instructions, and may comprise any suitable memory, such as a dynamic random access memory (DRAM), for example. The computer system 900 may also include one or more suitable integrated drive electronics (IDE) drive(s) 908 and/or other suitable storage devices. A graphics controller 904 controls the display of information on a display device 906, according to some embodiments.

The input/output controller hub (ICH) 924 provides an interface to I/O devices or peripheral components for the computer system 900. The ICH 924 may comprise any suitable interface controller to provide for any suitable communication link to the processor unit 902, memory unit 930 and/or to any suitable device or component in communication with the ICH 924. The ICH 924 can provide suitable arbitration and buffering for each interface.

For one embodiment, the ICH 924 provides an interface to the one or more IDE drives 908, such as a hard disk drive (HDD) or compact disc read only memory (CD ROM) drive, or to suitable universal serial bus (USB) devices through one or more USB ports 910. For one embodiment, the ICH 924 also provides an interface to a keyboard 912, selection device 914 (e.g., a mouse, trackball, touchpad, etc.), CD-ROM drive 918, and one or more suitable devices through one or more firewire ports 916. For one embodiment, the ICH 924 also provides a network interface 920 though which the computer system 900 can communicate with other computers and/or devices.

The computer system 900 may also include a machine-readable medium that stores a set of instructions (e.g., software) embodying any one, or all, of the methodologies for integrating social networking and wagering systems. Furthermore, software can reside, completely or at least partially, within the memory unit 930 and/or within the processor unit 902. The computer system 900 can also include a social networking module 937. The social networking module 937 can process communications, commands, or other information, to integrate social networking and wagering systems. Any component of the computer system 900 can be implemented as hardware, firmware, and/or machine-readable media including instructions for performing the operations described herein.

Wagering Game Machine Architecture

FIG. 10 is a conceptual diagram that illustrates an example of a wagering game machine architecture 1000, according to some embodiments. In FIG. 10, the wagering game machine architecture 1000 includes a wagering game machine 1006, which includes a central processing unit (CPU) 1026 connected to main memory 1028. The CPU 1026 can include any suitable processor, such as an Intel® Pentium processor, Intel® Core 2 Duo processor, AMD Opteron™ processor, or UltraSPARC processor. The main memory 1028 includes a wagering game unit 1032. In some embodiments, the wagering game unit 1032 can present wagering games, such as video poker, video black jack, video slots, video lottery, reel slots, etc., in whole or part.

The CPU 1026 is also connected to an input/output ("I/O") bus 1022, which can include any suitable bus technologies, such as an AGTL+ frontside bus and a PCI backside bus. The I/O bus 1022 is connected to a payout mechanism 1008, primary display 1010, secondary display 1012, value input device 1014, player input device 1016, information reader 1018, and storage unit 1030. The player input device 1016 can include the value input device 1014 to the extent the player input device 1016 is used to place wagers. The I/O bus 1022 is also connected to an external system interface 1024, which is connected to external systems (e.g., wagering game networks). The external system interface 1024 can include logic for exchanging information over wired and wireless networks (e.g., 802.11g transceiver, Bluetooth transceiver, Ethernet transceiver, etc.)

The I/O bus 1022 is also connected to a location unit 1038. The location unit 1038 can create player information that indicates the wagering game machine's location/movements in a casino. In some embodiments, the location unit 1038 includes a global positioning system (GPS) receiver that can determine the wagering game machine's location using GPS satellites. In other embodiments, the location unit 1038 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 10, in some embodiments, the location unit 1038 is not connected to the I/O bus 1022.

In some embodiments, the wagering game machine 1006 can include additional peripheral devices and/or more than one of each component shown in FIG. 10. For example, in some embodiments, the wagering game machine 1006 can include multiple external system interfaces 1024 and/or multiple CPUs 1026. In some embodiments, any of the components can be integrated or subdivided.

In some embodiments, the wagering game machine 1006 includes a social networking module 1037 and an online presence module 1080. The social networking module 1037 can process communications, commands, or other information, where the processing can integrate social networking and wagering systems. The online presence module 1080 can process communications, commands, or other information, where the processing can provide for an online presence for the wagering game machine 1006.

Furthermore, any component of the wagering game machine 1006 can include hardware, firmware, and/or machine-readable media including instructions for performing the operations described herein.

Wagering Game Machine

Figure 11:
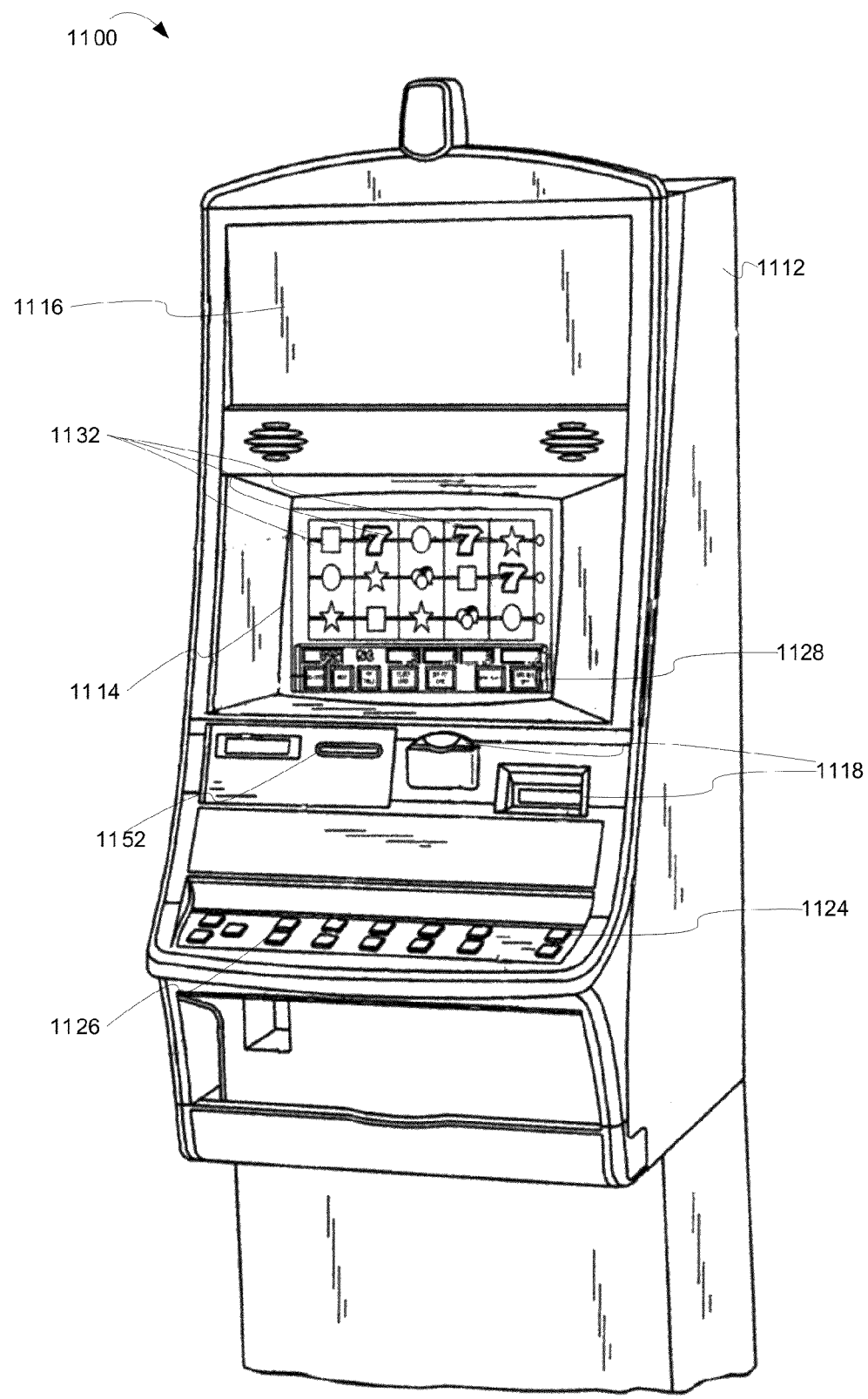
FIG. 11 depicts an illustration of a wagering game machine, according to some embodiments.

FIG. 11 is a conceptual diagram that illustrates an example of a wagering game machine 1100, according to some embodiments. Referring to FIG. 11, the wagering game machine 1100 can be used in gaming establishments, such as casinos. According to some embodiments, the wagering game machine 1100 can be any type of wagering game machine and can have varying structures and methods of operation. For example, the wagering game machine 1100 can be an electromechanical wagering game machine configured to play mechanical slots, or it can be an electronic wagering game machine configured to play video casino games, such as blackjack, slots, keno, poker, blackjack, roulette, etc.

The wagering game machine 1100 comprises a housing 1112 and includes input devices, including value input devices 1118 and a player input device 1124. For output, the wagering game machine 1100 includes a primary display 1114 for displaying information about a basic wagering game. The primary display 1114 can also display information about a bonus wagering game and a progressive wagering game. The wagering game machine 1100 also includes a secondary display 1116 for displaying wagering game events, wagering game outcomes, and/or signage information. While some components of the wagering game machine 1100 are described herein, numerous other elements can exist and can be used in any number or combination to create varying forms of the wagering game machine 1100.

The value input devices 1118 can take any suitable form and can be located on the front of the housing 1112. The value input devices 1118 can receive currency and/or credits inserted by a player. The value input devices 1118 can include coin acceptors for receiving coin currency and bill acceptors for receiving paper currency. Furthermore, the value input devices 1118 can include ticket readers or barcode scanners for reading information stored on vouchers, cards, or other tangible portable storage devices. The vouchers or cards can authorize access to central accounts, which can transfer money to the wagering game machine 1100.

The player input device 1124 comprises a plurality of push buttons on a button panel 1126 for operating the wagering game machine 1100. In addition, or alternatively, the player input device 1124 can comprise a touch screen 1128 mounted over the primary display 1114 and/or secondary display 1116.

The various components of the wagering game machine 1100 can be connected directly to, or contained within, the housing 1112. Alternatively, some of the wagering game machine's components can be located outside of the housing 1112, while being communicatively coupled with the wagering game machine 1100 using any suitable wired or wireless communication technology.

The operation of the basic wagering game can be displayed to the player on the primary display 1114. The primary display 1114 can also display a bonus game associated with the basic wagering game. The primary display 1114 can include a cathode ray tube (CRT), a high resolution liquid crystal display (LCD), a plasma display, light emitting diodes (LEDs), or any other type of display suitable for use in the wagering game machine 1100. Alternatively, the primary display 1114 can include a number of mechanical reels to display the outcome. In FIG. 11, the wagering game machine 1100 is an "upright" version in which the primary display 1114 is oriented vertically relative to the player. Alternatively, the wagering game machine can be a "slant-top" version in which the primary display 1114 is slanted at about a thirty-degree angle toward the player of the wagering game machine 1100. In yet another embodiment, the wagering game machine 1100 can exhibit any suitable form factor, such as a free standing model, bar top model, mobile handheld model, or workstation console model.

A player begins playing a basic wagering game by making a wager via the value input device 1118. The player can initiate play by using the player input device's buttons or touch screen 1128. The basic game can include arranging a plurality of symbols along a pay line 1132, which indicates one or more outcomes of the basic game. Such outcomes can be randomly selected in response to player input. At least one of the outcomes, which can include any variation or combination of symbols, can trigger a bonus game.

In some embodiments, the wagering game machine 1100 can also include an information reader 1152, which can include a card reader, ticket reader, bar code scanner, RFID transceiver, or computer readable storage medium interface. In some embodiments, the information reader 1152 can be used to award complimentary services, restore game assets, track player habits, etc.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A computer-implemented method comprising:
creating, by at least one processor, an online presence for a wagering game machine, wherein creating the online presence comprises,
generating a first instruction based on an Application Programming Interface (API) for a server hosting a social network, and
transmitting a first communication that includes the first instruction through at least one network interface of the wagering game machine over a network to the server, wherein in response to receiving the first communication the server executes the first instruction to create a user account for the wagering game machine on the social network; and
publishing, to the user account for the wagering game machine on the social network, wagering game activity that has occurred at the wagering game machine to the online presence for the wagering game machine, wherein the publishing comprises,
generating a second instruction based on the API for the server, and
transmitting a second communication that includes the second instruction through the at least one network interface over the network to the server, wherein in response to receiving the second communication the server executes the second instruction to publish the wagering game activity to the user account for the wagering game machine on the social network.

2. The computer-implemented method of claim 1, wherein publishing the wagering game activity comprises publishing a type of the wagering game activity, wherein the type is defined based on at least one of,
a theme of the wagering game playable at the wagering game machine at a time when the wagering game activity occurred, and
a location of the wagering game machine at a time when the wagering game activity occurred.

3. The computer-implemented method of claim 1, wherein publishing the wagering game activity comprises publishing the wagering game activity without providing identification of a wagering game player that was playing the wagering game machine at a time when the wagering game activity occurred, and wherein the online presence is accessible by a person without requiring the person to provide identification.

4. The computer-implemented method of claim 1, further comprising subscribing, by the wagering game machine, to an online presence of a different wagering game machine.

5. The computer-implemented method of claim 1, wherein the wagering game machine is located in a brick-and-mortar wagering game establishment.

6. A computer-implemented method comprising:
creating, by a first wagering game machine, a first online presence for the first wagering game machine, wherein creating the first online presence comprises,
generating a first instruction based on an Application Programming Interface (API) for a server hosting a social network, and
transmitting a first communication that includes the first instruction through at least one network interface of the first wagering game machine to the server, wherein in response to receiving the first communication the server executes the first instruction to create a user account for the first wagering game machine on the social network;

publishing, to the user account for the first wagering game machine on the social network, wagering game activity that has occurred at the first wagering game machine, wherein the publishing comprises,
generating a second instruction based on the API for the server, and
transmitting a second communication that includes the second instruction through the at least one network interface over a network to the server, wherein in response to receiving the second communication the server executes the second instruction to publish the wagering game activity to the user account for the first wagering game machine on the social network; and subscribing, by the first wagering game machine, to follow activities of a second user account for a second wagering game machine on the social network, wherein the subscribing comprises,
generating a third instruction based on the API for the server, and
transmitting a third communication that includes the third instruction through the at least one network interface over the network to the server, wherein in response to receiving the third communication the server executes the third instruction to subscribe the first wagering game machine to follow activities of the second user account for the second wagering game machine on the social network.

7. The computer-implemented method of claim 6, wherein publishing the wagering game activity further comprises publishing one or more types of the wagering game activity that occurred at the first wagering game machine,
wherein the one or more types of the wagering game activity are defined based on at least one of,
a theme of the wagering game playable at the first wagering machine at a time when the wagering game activity occurred, and
a location of the first wagering game machine at a time when the wagering game activity occurred.

8. The computer-implemented method of claim 6, wherein the first wagering game machine comprises a virtual wagering game machine.

9. A system comprising:
at least one processor;
at least one network interface; and
at least one memory device configured to store instructions that, when executed by the at least one processor, cause the at least one processor to:
create an online presence for a wagering game machine, wherein the instructions to cause the at least one processor to create the online presence comprise,
instructions to generate a first Application Programming Interface (API) instruction based on an API for a server hosting a social network, and
instructions to transmit a first communication that includes the first API instruction through the at least one network interface over a network to the server, wherein in response to receipt of the first communication the server is to execute the first API instruction to create a user account for the wagering game machine on the social network; and
publish, to the user account for the wagering game machine on the social network, wagering game activity that has occurred at the wagering game machine to the online presence for the wagering game machine, wherein the instructions to cause the at least one processor to publish comprise,
instructions to generate a second API instruction based on the API for the server, and
instructions to transmit a second communication that includes the second API instruction through the at least one network interface over the network to the server, wherein in response to receipt of the second communication the server is to execute the second API instruction to publish the wagering game activity to the user account for the wagering game machine on the social network.

10. The system of claim 9, wherein the instructions to cause the at least one processor to publish the wagering game activity comprises an instruction to cause the at least one processor to publish a type of the wagering game activity that is defined based on at least one of,
a theme of the wagering game playable at the wagering game machine at a time when the wagering game activity occurred, and
a location of the wagering game machine at a time when the wagering game activity occurred.

11. The system of claim 9, wherein the instructions to cause the at least one processor to publish the wagering game activity comprises an instruction to cause the at least one processor to publish the wagering game activity without providing identification of a wagering game player that was playing the wagering game machine at a time when the wagering game activity occurred, and wherein the online presence is accessible by a person without requiring the person to provide identification.

12. The system of claim 9, wherein the instructions cause the at least one processor to subscribe to an online presence of a different wagering game machine.

13. The system of claim 9, wherein the wagering game machine is located in a brick-and-mortar wagering game establishment.

14. One or more non-transitory machine-readable storage media including instructions which, when executed by one or more processors, cause the one or more processors to perform operations comprising:
creating an online presence for a wagering game machine, wherein creating the online presence comprises,
generating a first instruction based on an Application Programming Interface (API) for a server hosting a social network, and
transmitting a first communication that includes the first instruction through at least one network interface of the wagering game machine over a network to the server, wherein in response to receiving the first communication the server executes the first instruction to create a user account for the wagering game machine on the social network; and
publishing, to the user account for the wagering game machine on the social network, wagering game activity that has occurred at the wagering game machine to the online presence for the wagering game machine, wherein the publishing comprises,
generating a second instruction based on the API for the server, and
transmitting a second communication that includes the second instruction through the at least one network interface over the network to the server, wherein in response to receiving the second communication the server executes the second instruction to publish the wagering game activity to the user account for the wagering game machine on the social network.

15. The one or more non-transitory machine-readable storage media of claim 14, wherein publishing the wagering game activity comprises publishing a type of the wagering game activity that is defined based on at least one of,
   a theme of the wagering game playable at the wagering game machine at a time when the wagering game activity occurred, and
   a location of the wagering game machine at a time when the wagering game activity occurred.

16. The one or more non-transitory machine-readable storage media of claim 14, wherein publishing the wagering game activity comprises publishing the wagering game activity without providing identification of a wagering game player that was playing the wagering game machine at a time when the wagering game activity occurred, and wherein the online presence is accessible by a person without requiring the person to provide identification.

17. The one or more non-transitory-machine-readable storage media of claim 14, further comprising subscribing, by the wagering game machine, to an online presence of a different wagering game machine.

18. The one or more non-transitory machine-readable storage media of claim 14, wherein the wagering game machine is located in a brick-and-mortar wagering game establishment.

19. An apparatus comprising:
   means for creating, by a first wagering game machine, a first online presence for the first wagering game machine, wherein the means for creating the first online presence comprises,
      means for generating a first instruction based on an Application Programming Interface (API) for a server hosting a social network, and
      means for transmitting a first communication that includes the first instruction through at least one network interface of the first wagering game machine to the server, wherein in response to receiving the first communication the server executes the first instruction to create a user account for the first wagering game machine on the social network;
   means for publishing, to the user account for the first wagering game machine on the social network, wagering game activity that has occurred at the first wagering game machine, wherein the means for publishing comprises,
      means for generating a second instruction based on the API for the server, and
      means for transmitting a second communication that includes the second instruction through the at least one network interface over a network to the server, wherein in response to receiving the second communication the server executes the second instruction to publish the wagering game activity to the user account for the first wagering game machine on the social network; and
   means for subscribing, by the first wagering game machine, to follow activities of a second user account for a second wagering game machine on the social network, wherein the means for subscribing comprises,
      means for generating a third instruction based on the API for the server, and
      means for transmitting a third communication that includes the third instruction through the at least one network interface over the network to the server, wherein in response to receiving the third communication the server executes the third instruction to subscribe the first wagering game machine to follow activities of the second user account for the second wagering game machine on the social network.

20. The apparatus of claim 19, wherein the means for publishing the wagering game activity comprises means for publishing a type of the wagering game activity that occurred at the first wagering game machine,
   wherein the type of the wagering game activity is defined based on at least one of,
      a theme of the wagering game playable at the first wagering machine at a time when the wagering game activity occurred, and
      a location of the first wagering game machine at a time when the wagering game activity occurred.

* * * * *